US007873576B2

(12) United States Patent
Jones et al.

(10) Patent No.: US 7,873,576 B2
(45) Date of Patent: Jan. 18, 2011

(54) FINANCIAL DOCUMENT PROCESSING SYSTEM

(75) Inventors: John E. Jones, Winnetka, IL (US); William J. Jones, Barrington, IL (US); Frank M. Csultis, Gurnee, IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 1294 days.

(21) Appl. No.: 10/669,787

(22) Filed: Sep. 24, 2003

(65) Prior Publication Data

US 2004/0153408 A1 Aug. 5, 2004

Related U.S. Application Data

(60) Provisional application No. 60/413,387, filed on Sep. 25, 2002.

(51) Int. Cl.
*G06Q 40/00* (2006.01)
(52) U.S. Cl. .............................. 705/43; 705/35; 705/39; 705/40; 705/41; 705/42
(58) Field of Classification Search ........... 705/43 ATM
See application file for complete search history.

(56) References Cited

U.S. PATENT DOCUMENTS

| 2,936,684 | A | 5/1960 | Simjian | 396/332 |
|---|---|---|---|---|
| 3,104,314 | A | 9/1963 | Simjian | 346/22 |
| 3,148,932 | A | 9/1964 | Simjian | 346/22 |
| 3,150,912 | A | 9/1964 | Simjian | 346/22 |
| 4,027,142 | A | 5/1977 | Paup et al. | 235/379 |
| 4,109,238 | A | 8/1978 | Creekmore | 340/149 |
| 4,114,027 | A | 9/1978 | Slater et al. | 705/43 |
| 4,114,804 | A | 9/1978 | Jones et al. | 235/476 |
| 4,197,986 | A | 4/1980 | Nagata | 235/379 |
| 4,201,978 | A | 5/1980 | Nally | 382/140 |
| 4,205,780 | A | 6/1980 | Burns et al. | 235/454 |

(Continued)

FOREIGN PATENT DOCUMENTS

EP 0 314 312 5/1989

(Continued)

OTHER PUBLICATIONS

Vector Tech, Document Imaging; Video Tape Product Demonstration, date unknown.

(Continued)

*Primary Examiner*—James A Kramer
*Assistant Examiner*—James A Vezeris
(74) *Attorney, Agent, or Firm*—Nixon Peabody LLP

(57) ABSTRACT

A system for processing deposits and/or withdrawals in a financial institution accepts a plurality of documents, including currency bills, at an input receptacle of a document-processing device, converts the image of at least some of the documents to electronic data representing the image. The currency bills are denominated by the document processing device, and the total value of the bills included in each deposit is accumulated. Whenever the total value of the bills in a deposit exceeds a prescribed value, a report may be generated containing at least an identification of the specified account, the total value of the bills in the deposit, and the serial numbers of the bills. The serial numbers may be extracted from images of the bills.

45 Claims, 14 Drawing Sheets

U.S. PATENT DOCUMENTS

| | | | |
|---|---|---|---|
| 4,250,806 A | 2/1981 | Boyson et al. ................... 101/2 |
| 4,264,808 A | 4/1981 | Owens et al. ................. 235/379 |
| 4,321,672 A | 3/1982 | Braun et al. ................... 705/42 |
| 4,442,541 A | 4/1984 | Finkel et al. .................... 382/7 |
| 4,487,306 A | 12/1984 | Nao et al. ........................ 194/4 |
| 4,521,008 A | 6/1985 | Granzow et al. ................ 271/3 |
| 4,523,330 A | 6/1985 | Cain ........................... 382/140 |
| 4,594,664 A | 6/1986 | Hashimoto .................. 364/405 |
| 4,685,141 A | 8/1987 | Hoque et al. ..................... 382/7 |
| 4,774,663 A * | 9/1988 | Musmanno et al. ......... 705/36 R |
| 4,888,812 A | 12/1989 | Dinan et al. ..................... 382/7 |
| 4,905,840 A | 3/1990 | Yuge et al. ................... 209/534 |
| 4,948,174 A | 8/1990 | Thomson et al. .............. 283/58 |
| 4,960,981 A | 10/1990 | Benton et al. .................. 705/41 |
| 4,980,543 A | 12/1990 | Hara et al. ................... 235/379 |
| 4,984,280 A | 1/1991 | Abe ................................ 382/7 |
| 5,040,226 A | 8/1991 | Elischer et al. ................. 382/7 |
| 5,097,517 A | 3/1992 | Holt ................................ 382/7 |
| 5,120,944 A | 6/1992 | Kern et al. ................... 235/379 |
| 5,135,115 A | 8/1992 | Miller et al. ................. 209/564 |
| 5,144,115 A | 9/1992 | Yoshida ......................... 705/41 |
| 5,163,672 A | 11/1992 | Mennie ........................ 271/187 |
| 5,187,750 A | 2/1993 | Behera ............................ 382/7 |
| 5,191,525 A | 3/1993 | LeBrun et al. ............... 715/500 |
| 5,207,788 A | 5/1993 | Geib ............................. 271/122 |
| 5,237,159 A | 8/1993 | Stephens et al. ............. 235/379 |
| 5,265,008 A | 11/1993 | Benton et al. .................. 705/44 |
| 5,272,641 A | 12/1993 | Ford et al. .................... 370/392 |
| 5,295,196 A | 3/1994 | Raterman et al. ............... 382/7 |
| 5,363,949 A | 11/1994 | Matsubayashi |
| 5,371,798 A | 12/1994 | McWhortor ................. 380/51 |
| 5,373,550 A | 12/1994 | Campbell et al. ............ 379/100 |
| 5,430,664 A | 7/1995 | Cargill et al. ................ 194/207 |
| 5,444,794 A | 8/1995 | Uhland ........................... 705/45 |
| 5,467,405 A | 11/1995 | Raterman et al. ............ 382/135 |
| 5,467,406 A | 11/1995 | Graves et al. ................ 382/135 |
| 5,491,325 A | 2/1996 | Huang et al. ................... 705/45 |
| 5,504,822 A | 4/1996 | Holt ............................. 382/218 |
| 5,506,691 A | 4/1996 | Bednar et al. ............... 358/402 |
| 5,509,692 A | 4/1996 | Oz ................................. 283/70 |
| D369,984 S | 5/1996 | Larsen .......................... D10/97 |
| 5,530,773 A * | 6/1996 | Thompson .................. 382/138 |
| 5,537,486 A | 7/1996 | Stratigos et al. .............. 382/137 |
| 5,544,043 A | 8/1996 | Miki et al. ................... 364/406 |
| 5,590,196 A | 12/1996 | Moreau ......................... 380/18 |
| 5,592,377 A | 1/1997 | Lipkin ......................... 395/242 |
| 5,592,561 A | 1/1997 | Moore ......................... 382/103 |
| 5,594,225 A | 1/1997 | Botvin ......................... 235/379 |
| 5,602,933 A | 2/1997 | Blackwell et al. ........... 382/116 |
| 5,602,936 A | 2/1997 | Green et al. ................. 382/140 |
| 5,607,040 A | 3/1997 | Mathurin, Sr. |
| 5,615,280 A | 3/1997 | Izawa et al. .................. 382/135 |
| 5,633,949 A | 5/1997 | Graves et al. ................ 382/135 |
| 5,640,463 A | 6/1997 | Csulits ......................... 382/135 |
| 5,652,802 A | 7/1997 | Graves et al. ................ 382/135 |
| 5,678,046 A | 10/1997 | Cahill et al. ................. 395/616 |
| 5,680,472 A | 10/1997 | Conant ......................... 382/135 |
| 5,687,963 A | 11/1997 | Mennie ........................ 271/119 |
| 5,692,067 A | 11/1997 | Raterman et al. ............ 382/135 |
| 5,704,491 A | 1/1998 | Graves ......................... 209/534 |
| 5,724,438 A | 3/1998 | Graves ......................... 382/135 |
| 5,751,840 A | 5/1998 | Raterman et al. ............ 382/135 |
| 5,751,842 A | 5/1998 | Riach et al. .................. 382/137 |
| 5,754,673 A | 5/1998 | Brooks et al. ................ 382/112 |
| 5,790,693 A | 8/1998 | Graves et al. ................ 382/135 |
| 5,790,697 A | 8/1998 | Jones et al. ................... 382/135 |
| 5,806,650 A | 9/1998 | Mennie et al. ............... 194/206 |
| 5,813,510 A | 9/1998 | Rademacher ................ 194/206 |
| 5,815,592 A | 9/1998 | Mennie et al. ............... 382/135 |
| 5,822,448 A | 10/1998 | Graves et al. ................ 382/135 |
| 5,832,104 A | 11/1998 | Graves et al. ................ 382/135 |
| 5,832,463 A | 11/1998 | Funk |
| 5,867,589 A | 2/1999 | Graves et al. ................ 382/135 |
| 5,870,487 A | 2/1999 | Graves et al. ................ 382/135 |
| 5,870,725 A | 2/1999 | Bellinger et al. ............... 705/45 |
| 5,875,259 A | 2/1999 | Mennie et al. ............... 382/135 |
| 5,905,810 A | 5/1999 | Jones et al. ................... 382/135 |
| 5,909,502 A | 6/1999 | Mazur .......................... 382/135 |
| 5,909,503 A | 6/1999 | Graves et al. ................ 382/135 |
| 5,912,982 A | 6/1999 | Munro et al. ................. 382/135 |
| 5,917,930 A | 6/1999 | Kayani et al. ................ 382/135 |
| 5,923,413 A | 7/1999 | Laskowski ..................... 356/71 |
| 5,926,392 A | 7/1999 | York et al. ................... 700/223 |
| 5,938,044 A | 8/1999 | Weggesser .................. 209/534 |
| 5,940,623 A | 8/1999 | Watts et al. .................. 395/712 |
| 5,940,844 A * | 8/1999 | Cahill et al. ................. 715/526 |
| 5,943,655 A | 8/1999 | Jacobson ....................... 705/30 |
| 5,960,103 A | 9/1999 | Graves et al. ................ 382/135 |
| 5,966,456 A | 10/1999 | Jones et al. ................... 382/135 |
| 5,982,918 A | 11/1999 | Mennie et al. ............... 382/135 |
| 5,992,601 A | 11/1999 | Mennie et al. ............... 194/207 |
| 6,012,565 A | 1/2000 | Mazur .......................... 194/207 |
| 6,021,883 A | 2/2000 | Casanova et al. ............ 194/217 |
| 6,026,175 A | 2/2000 | Munro et al. ................. 382/135 |
| 6,028,951 A | 2/2000 | Raterman et al. ............ 382/135 |
| 6,039,645 A | 3/2000 | Mazur ............................ 453/10 |
| 6,065,672 A | 5/2000 | Haycock ...................... 235/379 |
| 6,068,194 A | 5/2000 | Mazur .......................... 235/492 |
| 6,072,896 A | 6/2000 | Graves et al. ................ 382/135 |
| 6,073,744 A | 6/2000 | Raterman et al. ............ 194/207 |
| 6,074,334 A | 6/2000 | Mennie et al. ............... 493/438 |
| 6,076,826 A | 6/2000 | Gerlier et al. ................ 271/274 |
| 6,097,834 A | 8/2000 | Krouse et al. ................ 382/137 |
| 6,101,266 A | 8/2000 | Laskowski et al. .......... 382/135 |
| 6,105,007 A | 8/2000 | Norris ............................ 705/38 |
| 6,119,946 A | 9/2000 | Teicher ........................ 235/492 |
| 6,128,402 A | 10/2000 | Jones et al. ................... 382/135 |
| 6,131,718 A | 10/2000 | Witschorik .................. 194/206 |
| 6,141,438 A | 10/2000 | Blanchester ................. 382/140 |
| 6,220,419 B1 | 4/2001 | Mennie ........................ 194/207 |
| 6,237,739 B1 | 5/2001 | Mazur et al. ................. 194/207 |
| 6,241,069 B1 | 6/2001 | Mazur et al. ................. 194/207 |
| 6,256,407 B1 | 7/2001 | Mennie et al. ............... 382/135 |
| 6,278,795 B1 | 8/2001 | Anderson et al. ............ 382/135 |
| 6,311,819 B1 | 11/2001 | Stromme et al. ............ 194/207 |
| 6,318,537 B1 | 11/2001 | Jones et al. ................... 194/346 |
| 6,351,551 B1 | 2/2002 | Munro et al. ................. 382/135 |
| 6,363,164 B1 * | 3/2002 | Jones et al. ................... 382/135 |
| 6,371,303 B1 | 4/2002 | Klein et al. .................. 209/534 |
| 6,373,965 B1 | 4/2002 | Liang .......................... 382/112 |
| 6,378,683 B2 | 4/2002 | Mennie ........................ 194/207 |
| 6,381,354 B1 | 4/2002 | Mennie et al. ............... 382/135 |
| 6,398,000 B1 | 6/2002 | Jenrick et al. ................ 194/200 |
| 6,415,983 B1 | 7/2002 | Ulvr et al. .................... 235/487 |
| 6,459,806 B1 | 10/2002 | Raterman et al. ............ 382/135 |
| 6,460,705 B1 | 10/2002 | Hallowell .................... 209/534 |
| 6,493,461 B1 | 12/2002 | Mennie et al. ............... 382/135 |
| 6,516,078 B1 * | 2/2003 | Yang et al. ................... 382/100 |
| 6,539,104 B1 | 3/2003 | Raterman et al. ............ 382/135 |
| 6,546,351 B1 | 4/2003 | Haycock et al. ............. 702/127 |
| 6,550,671 B1 * | 4/2003 | Brown et al. ................ 235/379 |
| 6,560,355 B2 | 5/2003 | Graves et al. ................ 382/135 |
| 6,573,983 B1 | 6/2003 | Laskowski ..................... 356/71 |
| 6,588,569 B1 | 7/2003 | Jenrick et al. ................ 194/206 |
| 6,601,687 B1 | 8/2003 | Jenrick et al. ................ 194/206 |
| 6,603,872 B2 | 8/2003 | Jones et al. ................... 382/135 |
| 6,621,919 B2 | 9/2003 | Mennie et al. ............... 382/135 |
| 6,628,816 B2 | 9/2003 | Mennie et al. ............... 382/135 |
| 6,636,624 B2 | 10/2003 | Raterman et al. ............ 382/135 |
| 6,647,136 B2 | 11/2003 | Jones et al. ................... 382/137 |
| 6,650,767 B2 | 11/2003 | Jones et al. ................... 382/135 |
| 6,654,486 B2 | 11/2003 | Jones et al. ................... 382/135 |
| 6,661,910 B2 | 12/2003 | Jones et al. ................... 382/135 |
| 6,665,431 B2 | 12/2003 | Jones et al. ................... 382/135 |

| | | | |
|---|---|---|---|
| 6,678,401 B2 | 1/2004 | Jones et al. | 382/135 |
| 6,678,402 B2 | 1/2004 | Jones et al. | 382/135 |
| 6,697,511 B1 | 2/2004 | Haycock | 382/135 |
| 6,705,470 B2 | 3/2004 | Klein et al. | 209/534 |
| 6,721,442 B1 | 4/2004 | Mennie et al. | 382/135 |
| 6,724,926 B2 | 4/2004 | Jones et al. | 382/135 |
| 6,724,927 B2 | 4/2004 | Jones et al. | 382/135 |
| 6,731,785 B1 | 5/2004 | Mennie et al. | 382/135 |
| 6,731,786 B2 | 5/2004 | Jones et al. | 382/135 |
| 6,748,101 B1 | 6/2004 | Jones et al. | 382/135 |
| 6,778,693 B2 | 8/2004 | Jones et al. | 382/136 |
| 6,798,899 B2 | 9/2004 | Mennie et al. | 271/10.09 |
| 6,810,137 B2 | 10/2004 | Jones et al. | 382/137 |
| 6,843,418 B2 | 1/2005 | Jones et al. | 235/462.01 |
| 6,860,375 B2 | 3/2005 | Hallowell et al. | 194/328 |
| 6,866,134 B2 | 3/2005 | Stromme et al. | 194/207 |
| 6,868,954 B2 | 3/2005 | Stromme et al. | 194/207 |
| 6,880,692 B1 | 4/2005 | Mazur et al. | 194/207 |
| 6,913,130 B1 | 7/2005 | Mazur et al. | 194/207 |
| 6,913,260 B2 | 7/2005 | Maier et al. | 271/265.04 |
| 6,915,893 B2 | 7/2005 | Mennie | 271/265.04 |
| 6,929,109 B1 | 8/2005 | Klein et al. | 194/206 |
| 7,006,664 B2 | 2/2006 | Paraskevakos | 382/100 |
| 7,034,324 B2 | 4/2006 | Voser | 250/556 |
| 7,092,560 B2 | 8/2006 | Jones et al. | 382/135 |
| 7,248,730 B2 | 7/2007 | Matsui et al. | 382/135 |
| 2001/0006557 A1 | 7/2001 | Mennie et al. | 382/135 |
| 2001/0015311 A1 | 8/2001 | Mennie | 194/207 |
| 2001/0019624 A1 | 9/2001 | Raterman et al. | 382/135 |
| 2001/0035603 A1 | 11/2001 | Graves et al. | 271/265.01 |
| 2001/0053241 A1 | 12/2001 | Haycock | 382/135 |
| 2002/0001393 A1 | 1/2002 | Jones et al. | 382/135 |
| 2002/0020603 A1 | 2/2002 | Jones et al. | 194/346 |
| 2002/0056605 A1 | 5/2002 | Mazur et al. | 194/207 |
| 2002/0082993 A1 | 6/2002 | Hoyos et al. | 705/43 |
| 2002/0085245 A1 | 7/2002 | Mennie et al. | 382/135 |
| 2002/0085745 A1 | 7/2002 | Jones et al. | 382/135 |
| 2002/0103757 A1 | 8/2002 | Jones et al. | 382/135 |
| 2002/0104785 A1 | 8/2002 | Klein et al. | 209/534 |
| 2002/0107801 A1 | 8/2002 | Jones et al. | 382/137 |
| 2002/0118871 A1 | 8/2002 | Jones et al. | 382/135 |
| 2002/0122580 A1 | 9/2002 | Jones et al. | 382/135 |
| 2002/0126885 A1 | 9/2002 | Mennie et al. | 382/135 |
| 2002/0126886 A1 | 9/2002 | Jones et al. | 382/135 |
| 2002/0131630 A1 | 9/2002 | Jones et al. | 382/135 |
| 2002/0136442 A1 | 9/2002 | Jones et al. | 382/135 |
| 2002/0145035 A1 | 10/2002 | Jones | 235/379 |
| 2002/0154804 A1 | 10/2002 | Jones et al. | 382/135 |
| 2002/0154805 A1 | 10/2002 | Jones et al. | 382/135 |
| 2002/0154806 A1 | 10/2002 | Jones et al. | 382/135 |
| 2002/0154807 A1 | 10/2002 | Jones et al. | 382/135 |
| 2002/0154808 A1 | 10/2002 | Jones et al. | 382/135 |
| 2002/0186876 A1 | 12/2002 | Jones et al. | 382/135 |
| 2003/0006277 A1 | 1/2003 | Maskatiya et al. | 235/379 |
| 2003/0009420 A1 | 1/2003 | Jones | 705/39 |
| 2003/0015395 A1 | 1/2003 | Hallowell et al. | 194/206 |
| 2003/0015396 A1 | 1/2003 | Mennie | 194/206 |
| 2003/0059098 A1 | 3/2003 | Jones et al. | 382/135 |
| 2003/0062242 A1 | 4/2003 | Hallowell et al. | 194/302 |
| 2003/0081824 A1 | 5/2003 | Mennie et al. | 382/135 |
| 2003/0099379 A1 | 5/2003 | Monk et al. | 382/115 |
| 2003/0108233 A1 | 6/2003 | Raterman et al. | 382/135 |
| 2003/0121752 A1 | 7/2003 | Stromme et al. | 194/207 |
| 2003/0121753 A1 | 7/2003 | Stromme et al. | 194/207 |
| 2003/0132281 A1 | 7/2003 | Jones et al. | 235/379 |
| 2003/0139994 A1 | 7/2003 | Jones | 705/36 |
| 2003/0168308 A1 | 9/2003 | Maier et al. | 194/207 |
| 2003/0174874 A1 | 9/2003 | Raterman et al. | 382/135 |
| 2003/0182217 A1 | 9/2003 | Chiles | 705/35 |
| 2003/0198373 A1 | 10/2003 | Raterman et al. | 382/135 |
| 2003/0202690 A1 | 10/2003 | Jones et al. | 382/139 |
| 2004/0003980 A1 | 1/2004 | Hallowell et al. | 194/206 |
| 2004/0016621 A1 | 1/2004 | Jenrick et al. | 194/206 |
| 2004/0016797 A1 | 1/2004 | Jones et al. | 235/462.01 |
| 2004/0028266 A1 | 2/2004 | Jones et al. | 382/135 |
| 2004/0083149 A1 | 4/2004 | Jones | 705/35 |
| 2004/0131230 A1 | 7/2004 | Paraskevakos | |
| 2004/0145726 A1 | 7/2004 | Csulits et al. | 356/71 |
| 2004/0149538 A1 | 8/2004 | Sakowski | 194/207 |
| 2004/0153408 A1 | 8/2004 | Jones et al. | 705/43 |
| 2004/0154964 A1 | 8/2004 | Jones | 209/534 |
| 2004/0251110 A1 | 12/2004 | Jenrick et al. | |
| 2005/0029168 A1 | 2/2005 | Jones et al. | 209/534 |
| 2005/0035034 A1 | 2/2005 | Long | |
| 2005/0040225 A1 | 2/2005 | Csulits et al. | 235/379 |
| 2005/0047642 A1 | 3/2005 | Jones et al. | |
| 2005/0060055 A1 | 3/2005 | Hallowell | 700/213 |
| 2005/0060059 A1 | 3/2005 | Klein et al. | 700/213 |
| 2005/0060061 A1 | 3/2005 | Jones | 700/226 |
| 2005/0077142 A1 | 4/2005 | Tam et al. | 194/217 |
| 2005/0086271 A1 | 4/2005 | Jones et al. | 707/200 |
| 2005/0087422 A1 | 4/2005 | Maier et al. | 194/207 |
| 2005/0108165 A1 | 5/2005 | Jones et al. | 705/43 |
| 2005/0117791 A2 | 6/2005 | Raterman et al. | 382/135 |
| 2005/0117792 A2 | 6/2005 | Raterman et al. | 382/135 |
| 2005/0150738 A1 | 7/2005 | Hallowell et al. | 382/135 |
| 2005/0163361 A1 | 7/2005 | Jones et al. | 382/135 |
| 2005/0163362 A1 | 7/2005 | Jones et al. | 382/137 |
| 2005/0169511 A1 | 8/2005 | Jones | 382/135 |
| 2005/0173221 A1 | 8/2005 | Maier et al. | 194/207 |
| 2006/0054454 A1 | 3/2006 | Oh | 194/207 |

FOREIGN PATENT DOCUMENTS

| | | |
|---|---|---|
| EP | 0 416 916 | 3/1991 |
| EP | 0 593 209 | 4/1994 |
| EP | 0 616 296 | 9/1994 |
| EP | 0 633 533 | 1/1995 |
| EP | 0 718 809 | 6/1996 |
| EP | 0 984 410 | 3/2000 |
| EP | 1 028 359 | 8/2000 |
| EP | 1 134 704 | 9/2001 |
| EP | 1 160 737 | 12/2001 |
| FR | 2 539 898 | 7/1984 |
| FR | 2 722 316 | 1/1996 |
| GB | 2 355 522 | 4/2001 |
| JP | 4-243497 | 8/1992 |
| WO | WO 91/11778 | 8/1991 |
| WO | WO 92/16931 | 10/1992 |
| WO | WO 92/17394 | 10/1992 |
| WO | WO 93/23824 | 11/1993 |
| WO | WO 95/10088 | 4/1995 |
| WO | WO 95/24691 | 9/1995 |
| WO | WO 96/10800 | 4/1996 |
| WO | WO 96/36933 | 11/1996 |
| WO | WO 97/30422 | 8/1997 |
| WO | WO 97/43734 | 11/1997 |
| WO | WO 97/45810 | 12/1997 |
| WO | WO 98/12662 | 3/1998 |
| WO | WO 98/13785 | 4/1998 |
| WO | WO 98/24052 | 6/1998 |
| WO | WO 98/24067 | 6/1998 |
| WO | WO 98/26364 | 6/1998 |
| WO | WO 98/35323 | 8/1998 |
| WO | WO 98/40839 | 9/1998 |
| WO | WO 98/47100 | 10/1998 |
| WO | WO 98/50892 | 11/1998 |
| WO | WO 98/59323 | 12/1998 |
| WO | WO 99/09511 | 2/1999 |
| WO | WO 99/14668 | 3/1999 |
| WO | WO 99/23601 | 5/1999 |
| WO | WO 99/41695 | 8/1999 |
| WO | WO 99/48040 | 9/1999 |
| WO | WO 99/48042 | 9/1999 |
| WO | WO 99/50796 | 10/1999 |
| WO | WO 00/24572 | 5/2000 |

| | | |
|---|---|---|
| WO | WO 00/58876 | 10/2000 |
| WO | WO 01/08108 | 2/2001 |
| WO | WO 01/59685 | 8/2001 |
| WO | WO 01/59723 | 8/2001 |
| WO | WO 02/29735 | 4/2002 |
| WO | WO 02/054360 | 7/2002 |
| WO | WO 03/005312 | 1/2003 |
| WO | WO 03/028361 | 4/2003 |
| WO | WO 03/029913 | 4/2003 |
| WO | WO 03/030113 | 4/2003 |
| WO | WO 03/067532 | 8/2003 |
| WO | WO 03/107282 | 12/2003 |
| WO | WO 2004/010367 | 1/2004 |
| WO | WO 2004/027717 | 4/2004 |
| WO | WO 2004/036508 | 4/2004 |
| WO | WO 2004/038631 | 5/2004 |
| WO | WO 2004/068422 | 8/2004 |
| WO | WO 2005/013209 A2 | 2/2005 |
| WO | WO 2005/017842 A1 | 2/2005 |
| WO | WO 2005/029240 A2 | 3/2005 |
| WO | WO 2005/036445 A1 | 4/2005 |
| WO | WO 2004/041134 A2 | 5/2005 |

OTHER PUBLICATIONS

Discussion of FR 2 722 316 in European Patent Office, Communication pursuant to Article 96(2), EP 04 020 193.1, Jul. 18, 2005, 4 pages.

ShieldSpec LLC, Currency Manager for Law Enforcement, 1 page (downloaded from www.shieldspec.com/product.html on Aug. 18, 2010).

ShieldSpec LLC, Presentation on Currency Manager for Law Enforcement, 10 pages (downloaded from www.shieldspec.com/documents/CurrencyManagerLawEnforcement.pdf on Aug. 18, 2010), © 2005.

* cited by examiner

FINANCIAL DOCUMENT PROCESSING SYSTEM

PRIORITY CLAIM AND CROSS REFERENCE

The present application claims priority from co-pending U.S. Provisional Application for Patent Ser. No. 60/413,387, filed Sep. 25, 2002, the disclosure of which is hereby incorporated by reference.

BACKGROUND OF THE PRESENT INVENTION

1. Field of the Invention

The present invention relates to processing financial documents. More particularly, but not by way of limitation, the present invention relates to an apparatus and method for monitoring deposits and/or withdrawals as they are made, archiving information derived from the deposit and withdrawal transactions, and retrieving and using the archived information for various automated operations.

2. Description of the Related Art

It is well known that information obtained from various financial documents, including currency bills, as they enter and leave a financial institution, may be useful in various automated operations within the institution, if that information may be retrieved. For example, the laws of various countries require banks and other financial institutions to report to the governments of such countries any cash deposits in excess of a prescribed value, e.g., in excess of $10,000 in the U.S. Those laws typically specify the type of information to be included in such reports, such as identification of the account to which the deposit was made, the amount of the deposit, the location of the facility where the deposit was made, and other useful information.

Based upon the foregoing there is a great need to have a system that is capable of monitoring all deposits made at a financial institution and automatically generating the required report whenever the total value of a cash deposit exceeds the threshold value prescribed by the laws of the country in which that facility is located.

SUMMARY OF THE INVENTION

The present invention satisfies this need by providing a system for accepting deposits of financial documents, such as currency bills, and using a document processing device for crediting to a specified account. This system accepts a plurality of documents, including currency bills, at an input receptacle of the document processing device, converts the image of at least the serial numbers on the currency bills to electronic data representing the image, and extracts the serial numbers from the electronic data representing the image. The currency bills are denominated by the document processing device, and the total value of the bills included in each deposit is accumulated. Whenever the total value of the bills in a deposit exceeds a prescribed value, a report is generated containing at least an identification of the specified account, the total value of the bills in the deposit, and the serial numbers of the bills.

An alternative embodiment according to the principles of the present invention is also capable of processing withdrawals of currency bills from a specified account in a financial institution by accepting a withdrawal request and identifying a set of currency bills to satisfy that request, and storing an identification of the withdrawal in association with electronic data representing images of that set of currency bills.

Yet another embodiment according to the principles of the invention provides a scanning system that is capable of tracking currency bills in a financial institution, by scanning at least a portion of the images of the currency bills taken in by the financial institution to produce electronic data representing the images, storing the electronic data representing the images in association with data representing the locations of the bills within the financial institution at specified times, and updating the stored data when the bills are moved to a different location, to permit retrieval of the images of the bills at specified locations at specified times.

In another embodiment, electronic images of checks deposited in a financial institution are obtained at entry portals of the institution.

The above summary of the present invention is not intended to represent each embodiment, or every aspect, of the present invention. This is the purpose of the figures and the detailed description which follow.

BRIEF DESCRIPTION OF THE DRAWINGS

A more complete understanding of the method and apparatus of the present invention may be obtained by reference to the following Detailed Description when taken in conjunction with the accompanying Drawings wherein.

Figure 1:
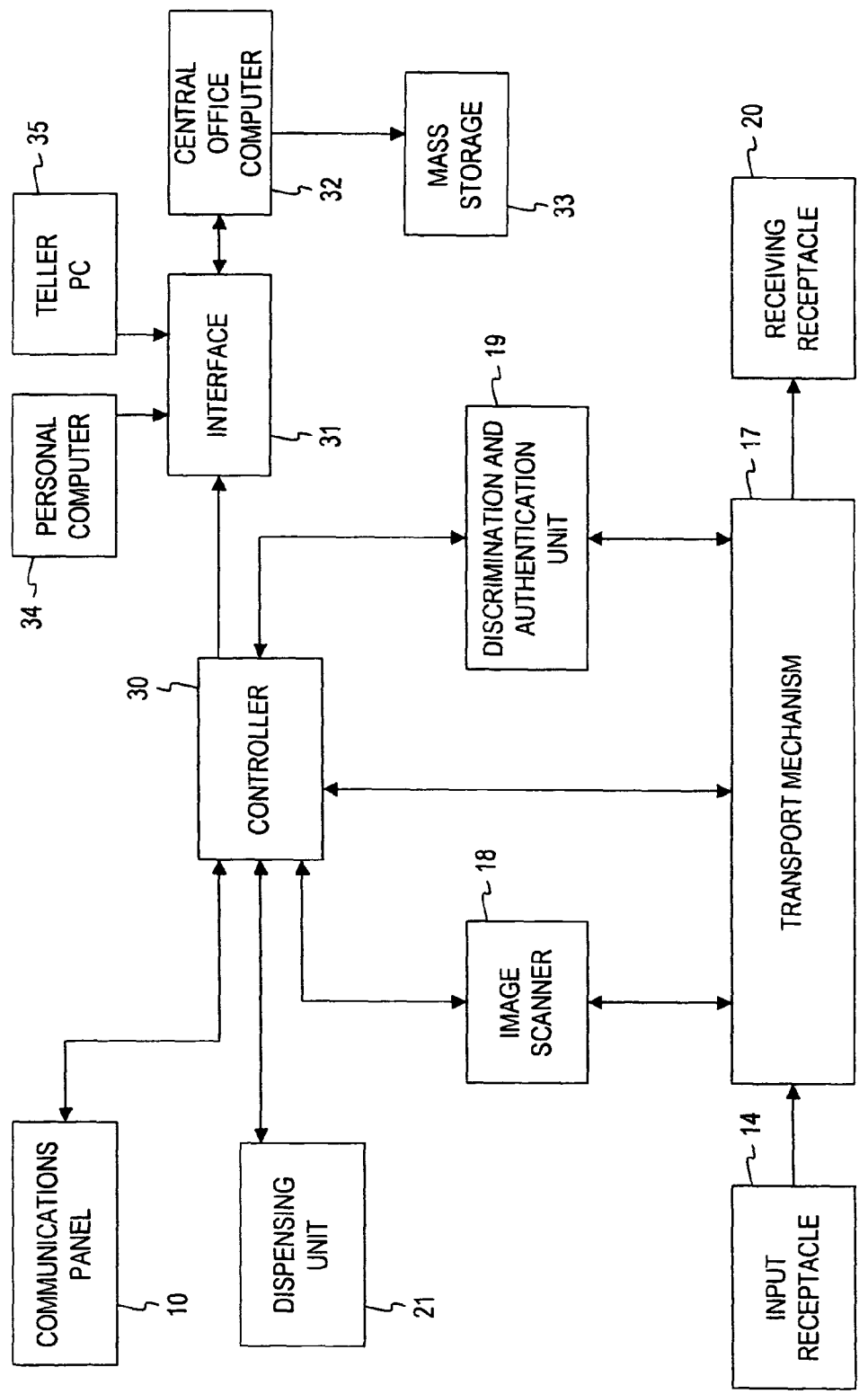
FIG. 1 is a block diagram of the components of a document and currency processing system for use in the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE PRESENTLY PREFERRED EXEMPLARY EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

When describing various embodiments of the present invention, the term "currency bills" or "bills" refers to official currency bills including both U.S. currency bills, such as a $1, $2, $5, $10, $20, $50, or $100 bill, and foreign currency bills. Foreign currency bills are bills issued by a non-U.S. governmental agency as legal tender, such as a Euro, Japanese Yen, or British Pound bill.

The term "currency documents" includes both currency bills and "substitute currency media." Examples of substitute currency media include, but are not limited to casino tickets (also variously called cashout vouchers or coupons) such as "EZ Pay" tickets issued by International Gaming Technology or "Quicket" tickets issued by Casino Data Systems; casino script; promotional media such as Disney Dollars or Toys 'R Us "Geoffrey Dollars"; or retailer coupons, gift certificates, gift cards, or food stamps. Substitute currency media may include a barcode, which are referred to herein as "barcoded tickets." Examples of barcoded tickets include casino tickets such as "EZ Pay" tickets and "Quicket" cashout tickets, barcoded retailer coupons, barcoded gift certificates, or any other promotional media that includes a barcode.

Although the following descriptions of certain embodiments of the invention will refer to the "denomination" of currency bills as a criterion used in evaluating the currency bills, other predetermined criteria may be used to evaluate the currency bills, such as, for example, color, size, and orientation.

The term "non-currency documents" includes any type of document, except currency documents, that may be evaluated according to a predetermined criterion. For example, such as color, size, shape, orientation, or that can simply be imaged. Examples of such documents include checks, deposit slips, withdrawal slips, coupon and loan payment documents, food stamps, cash tickets, and all other documents utilized for transactions at financial institutions, including not only deposits and withdrawals but also loan applications, credit card applications, student loan applications, accounting invoices, debit forms, account transfer forms, and all other types of forms with predetermined fields.

The term "financial documents" includes both currency documents and non-currency documents.

One embodiment of the system described below is capable of monitoring all deposits made at a financial institution and automatically generating the required report whenever the total value of a cash deposit exceeds the threshold value prescribed by the laws of the country in which that facility is located. The report that is automatically generated by this system includes all the information required by the applicable laws, and can also include the serial numbers and/or the complete images of the currency included in all deposits that exceed the prescribed threshold value.

According to one embodiment, the present invention is directed to an improved system for processing deposits to, and/or withdrawals from, specified accounts in banks and other financial institutions, as well as casinos and other businesses in which funds are deposited and withdrawn. This system may use automated equipment for all or most of the processing steps. The core of the automated equipment is illustrated by the block diagram in FIG. 1, and one embodiment of a customer interface containing a major portion of the automated equipment is illustrated in FIG. 2. A user makes a deposit by using a communications panel 10 to input the identification of the account to which the deposit is to be credited, the amount of the deposit, and any other required information, such as a password or PIN.

In the particular customer interface unit shown in FIG. 2, the communications panel includes a keyboard 11 that interacts with a display screen 12, and also includes a card reading slot for receiving a user's identification card. The user may log onto the machine by inserting the card into the slot 13 to access the machine. A card reader may obtain the user's account information from the card. The user is then prompted to enter a PIN number and, if the PIN number matches the account information read from the card, the user is prompted to deposit one or more documents into an input receptacle 14. A microphone 15 and a speaker 16 are also provided to allow two-way communication between the user and a bank office, such as a teller at a bank's central office. Thus, during the operating hours of a financial institution, bank personnel are connected to the system by the microphone 15 and speaker 16. Other modules that may be added to the system include a smart card acceptance module 25 for accepting smart cards, a smart card dispensing module for dispensing smart cards, and/or an optical reader module for accepting and dispensing optical media.

Figure 2:
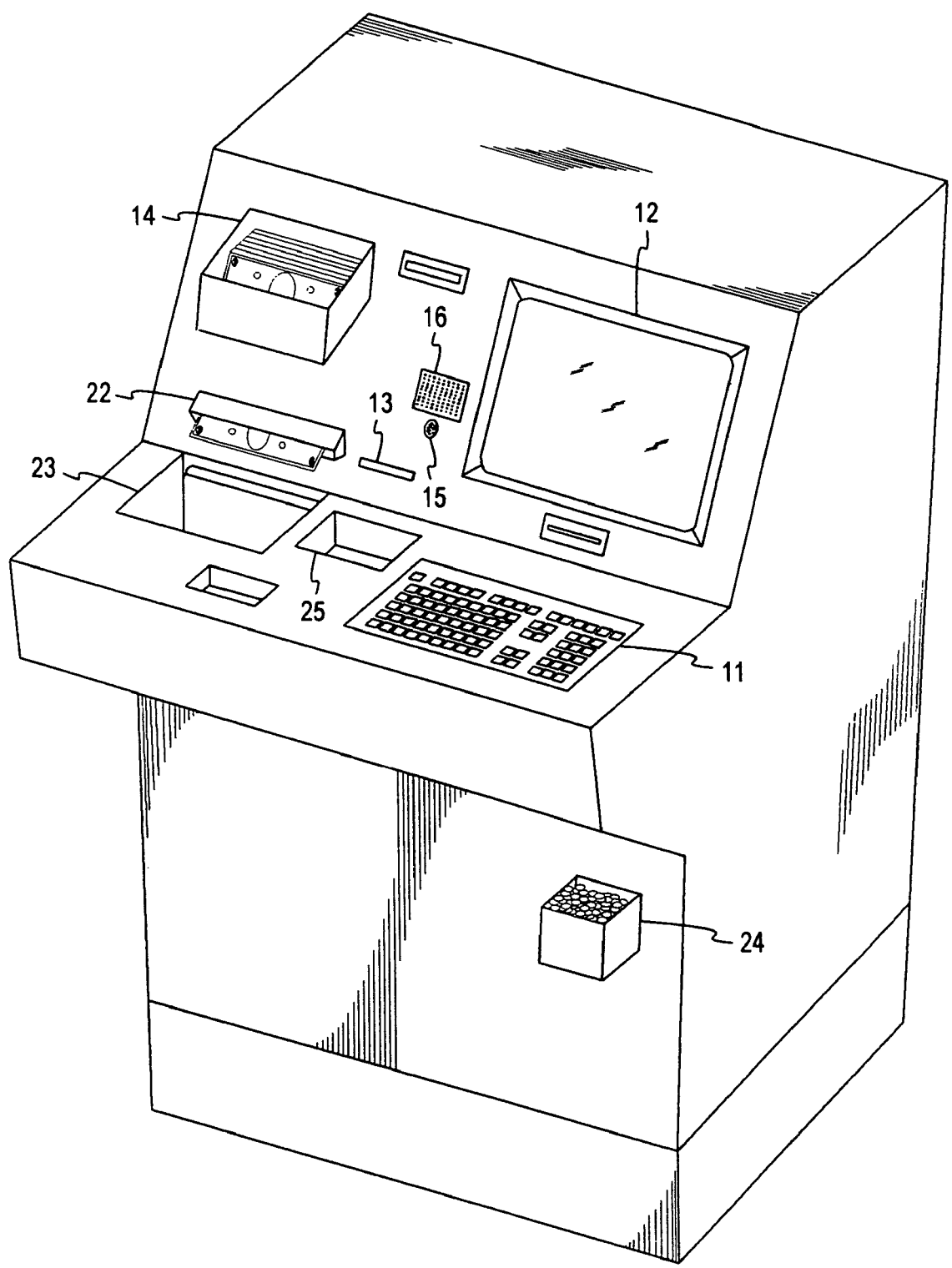
FIG. 2 is a perspective view of one embodiment of a customer interface unit containing the processing system of FIG. 1.

After the user places the currency to be deposited into the input receptacle 14, a transport mechanism 17, as shown in FIG. 1, transports the currency bills in seriatim from the input receptacle 14 past an image scanner 18, where the bills are illuminated and scanned. The scanner 18, described in greater detail below, scans the image of at least serial numbers on the bills and generates electronic data representing that image. The scanner typically contains built-in light sources, such as LEDs, and either CCD sensors or CMOS sensors that detect the light reflected off the document and convert that light to a corresponding electrical signal. Multiple sensors are typically arranged in a line or an x-y array that extends across the full width of the document being scanned, with each sensing element producing an electrical signal representing one pixel of the scanned image. The signal for each pixel may be processed as a single bit that simply represents black or white, or it may be processed as multiple bits representing a gray level or a color. Sensor modules having all the light sources and sensing elements required to scan the image on a document are commercially available, and are often referred to as Contact Image Sensors ("CIS"). These modules produce standard video output signals, either digital or analog, that may be used to display the scanned images and/or stored for subsequent retrieval and display of the scanned images. These electrical signals or electronic data are often referred to as "electronic images." Digital signals may be used for storage of large numbers of images over extended periods of time, such as the seven-year period for which banks are legally required to store checks after they have been cashed. Compression techniques may be used to reduce the amount of data that is stored, while still permitting the images to be displayed when that data is retrieved from storage.

The image data may be processed to extract the serial numbers of the bills. If the full image of each bill is scanned, the resulting image data is analyzed to recognize the serial number field within each bill, and then the serial numbers contained within those fields are extracted and stored for later use by the system. As described below, other types of information may also be extracted from the image data. The processing of the image data to recognize specified fields and to extract serial numbers or other information from those fields may be performed by commercially available Optical Character Recognition ("OCR") engines or Intelligent Character Recognition ("ICR") engines. These engines automatically convert pre-defined characters or data fields into editable text and map it directly into a database that may be displayed, stored and retrieved. For example, electronic images of handwritten numeric amounts, such as amounts written on checks, may be electronically converted into computer-usable data.

The system may also be used to capture any document image for electronic document display, electronic document storage, electronic document transfer, electronic document recognition (such as denomination recognition or check amount recognition) or any other processing function that may be performed using an electronic image. For example, the customer might place a deposit slip in the input receptacle 14 along with the currency, and the deposit might include endorsed checks as well as currency. The images of all these documents may be scanned, processed and stored for future retrieval.

In FIG. 1, the transport mechanism 17 also transports the bills past a discrimination and authentication unit 19 that is also described in greater detail below. The discrimination and authentication unit 19 authenticates each bill and/or determines the denomination of the bill. On other documents, such as deposit slips and checks, the system may capture information such as the account number, bank number, check number and signatures. The discrimination and authentication unit 19 also directs the transport mechanism 17 to place the document in a selected receiving receptacle 20 as described below.

The receiving receptacle 20 may be a single receptacle into which all documents transported by the transport mechanism 17 are delivered. Alternatively, dual receptacles may be provided for receiving identifiable documents in the first receptacle and unidentifiable documents in the second receptacle. Additionally, any number of receptacles may be used to receive the documents, such as separate receptacles for $1, $5, $10, $20, $50, and $100 bills.

The illustrative system also includes a dispensing unit 21 that can return or dispense funds to a user. For example, when the user is depositing currency in an account, the system has the capability to return all or part of a deposit back to the user in the form of bills, coins, or other media via the dispensing unit 21. For example in the unit shown in FIG. 2, loose currency is dispensed from a slot 22, strapped currency from a receptacle 23, and loose or rolled coin at a receptacle 24. The amount of payback to the user may be supplemented by funds from other accounts as well, as described below. The dispensing unit 21 is capable of responding to a variety of media including money orders, smart cards, and checks and may include separate units for different types of media.

A controller 30 manages the operation of the system. The controller 30 directs the flow of documents from the input receptacle 14 through the transport mechanism 17, past the full image scanner 18 and the discrimination and authentication unit 19, and into the receiving receptacle 20. The transport mechanism carries the documents through the system such that the scanhead extends across their wide dimension, e.g., bills are transported with their narrow edges parallel to the direction of movement. Alternatively, the documents may be passed through the system in the direction of the long dimension of the documents so that the scanhead extends across their narrow dimension. The controller 30 also directs the dispensing unit 21 to return or dispense funds to the user and routes information from the image scanner 18 and the discrimination and authentication unit 19 to an interface 31 that communicates with an accounting system or central office computer 32. The controller 30 is also capable of directing information from an outside office through the interface 31 and to the communications panel 10. Finally, the controller 30 selectively processes information from the image scanner 18 and the discrimination and authentication unit 19 for use by the system.

The system, via the link with a central office computer 32, is capable of processing transactions substantially immediately. That is, deposits may be processed in real time, while the customer is logged onto the machine, or within a short time after the customer logs off, rather than waiting for the end of the day. Also, full or partial images of all documents are fed into and/or dispensed by the machine may be stored on mass storage devices 33 at the central office. Partial images may include, for example, only the serial-number fields of currency bills, only the front side of a deposit slip, or any pre-selected fields on checks. In any event, the electronic data representing the full or partial image may be capable of being retrieved and displaying that image at a future time. The images can also be stored at the unit itself, or at another remote system, or may be temporarily stored and forwarded at a later time.

A personal computer 34 can also be connected to the system to process data from the scanner. Processing of scanned data can occur at the personal computer 34, within the image scanner 18 or the discrimination and authentication unit 19, or at the central office computer 32. The system also may be connected to a teller station 35 (which includes a monitor).

The central office computer 32 (which includes a monitor) also receives and displays images of the documents from the system. If the documents are not recognizable, the bank employee can discuss the document with the customer. In this case, the bank employee can decide whether to accept the document immediately for credit after reviewing the image on the terminal. Enough information may have been scanned on an unrecognizable document that review by the bank employee on the display will enable the bank employee to accurately call the value of the document.

Additionally, displaying the image of a document may enable a teller to enter missing data via the keyboard, if the relevant portion of the image is recognizable. If the teller is near the machine and an image on the monitor is unclear, the teller may remove the document from the scanner, inspect the document, and enter the missing data. The value can also be entered via the denomination keys and other information may be entered via an alphanumeric keypad, as described below, or with a touch screen or mouse and application software. In some situations, the customer may enter the value or other information concerning the unidentified documents. This entry is made via the keyboard, and credit is given to the customer's account only after the document is verified by bank personnel. In other situations, the document may be returned to the customer.

An entry portal may take a variety of different forms. Self-service portals may be provided by ATMs or other large multi-function machines capable of imaging and/or otherwise processing incoming documents and then transferring the images and/or other information obtained by processing the documents electronically rather than by transferring the physical documents. These self-service machines are also capable of dispensing the received documents, or storing them until there is a need to physically transfer them. Sometimes that transfer will be simply to a document destruction site or to an archive. Attended portals, such as teller stations in banks, may be equipped with the smaller machines that image and/or otherwise process primarily incoming documents. These smaller machines can also be used for selective processing of outgoing documents, such as imaging the currency bills in cash withdrawals and automatically generating reports when the cash withdrawals exceed prescribed thresholds.

The check images obtained by scanning checks at the entry portals may be used in an electronic check collection system in which check payment information is exchanged electronically. The electronic images of the checks can also be electronically endorsed, e.g., by tagging the electronic image of the check with electronic endorsement information. The payee named on a check normally deposits the check with the payee's bank (the "bank of first deposit," or "BOFD"), which credits the amount on the check to the payee's account. The BOFD then sends the check to the drawer's bank (the "paying bank"). If the drawer and the payee use the same bank, the check is an "on-us" check and may be processed within that one bank. If the drawer and the payee use different banks, the check is an "interbank" or "transit" check which must be cleared through an interbank collection system. When the check reaches the paying bank, that bank settles with the presenting bank, and the amount of the check is deducted from the drawer's account. The check is normally endorsed by the presenting bank as well as the BOFD and any intermediaries involved in the check collection process, and any or all of these endorsements may be effected by electronically tagging the check image with the required endorsement information. Thus, physical transfer of the paper checks may be avoided, saving both time and expense.

After the images and/or the serial numbers of currency bills entering a bank or other financial institution have been stored in electronic form, that information may be used to track the movement of the bills within that institution. That is, the image or serial number data for each bill may be associated with data representing the location of that bill and the time and date when the bill was delivered to that location, and then such data may be updated each time the currency bill is moved to a different location. For example, when currency bills are delivered to a given teller station, the location data for those bills may be updated to identify that teller station and the time and date when the currency is delivered to that station. Then if a robbery occurs at that teller station, the computer records will show which serial numbers were delivered to that station and which serial numbers were dispensed to customers, and it may be determined which serial numbers, if any, remain at that station. By subtracting the latter two sets of numbers from the first set, it may be determined exactly which serial numbers were taken in the robbery, which may be useful information for law enforcement agencies. Also, other financial institutions that scan incoming currency bills may be notified of the serial numbers of the stolen bills so that they can detect the deposit of any such bills, and identify the depositor.

The system of FIG. 1 may also be used to process withdrawals. As mentioned previously in FIG. 2, the system has a slot 13 for the insertion of a customer identification card, and the customer will typically be required to enter a PIN identification number through the keyboard 11. After identification of the customer account is determined, and the customer identification has been confirmed from the PIN number, the customer may request a withdrawal via the keyboard or by inserting a document such as a check or withdrawal slip into the input receptacle 14 so that the document may be scanned to produce a storable electronic image. Immediate payment to the customer may be made after scanning the inserted document and determining that the identified account contains sufficient funds to permit a withdrawal of the amount requested.

Prior to dispensing a set of currency bills that satisfies the withdrawal request, those bills are scanned and/or a determination is made that electronic images of those bills are in the archive. The latter determination may be made by identifying the serial numbers of the bills to be dispensed, and conducting a search of previously stored images by serial number. This determination may be made after scanning all the bills to be dispensed, to determine which images need to be stored, or the determination may be made before scanning so that only those bills without previously stored images may be scanned. The scanning may be initiated automatically in machines that can automatically dispense currency bills, or may be initiated manually by feeding the currency bills into a scanner for processing before they are delivered to the customer.

For each withdrawal transaction, the amount and date of the withdrawal, the account identification, and the serial numbers of the bills dispensed for that withdrawal are stored. Then if any questions arise in the future, the stored information for any given withdrawal transaction may be retrieved, and the serial numbers of the bills may be used to also retrieve the images of the bills dispensed for that transaction. If required, reports containing this same information may be generated automatically for any cash withdrawal that exceeds a specified threshold, or for specified accounts. Alternatively or additionally, the system may be programmed to automatically generate a report in response to the dispensing of currency bills having specified serial numbers, or of specified denominations (such as $100 bills).

By "central accounting system," it is meant to include the hardware and software associated with accessing, maintaining, tracking, and updating savings accounts, checking accounts, credit card accounts, business and commercial loans, consumer payments, or other similar accounts at locations remote from the full image scanners. The term includes any of three broad types of systems: systems where deposits are made; systems where withdrawals are made; and systems where both deposits and withdrawals are made. Although the central accounting system described herein is described as being employed at a financial institution such as a bank, it will be understood that any business, public or private institution, or individual can employ a central accounting system to process transactions. By "financial institution" it is meant to include banks, savings and loans, investment houses, and all other types of financial institutions whether private, public, or government. The following description is in terms of banks but it will be understood that it is applicable to other financial institutions as well.

The central accounting system processes information associated with checking accounts which may be held by individual consumers, businesses, trade associations, trusts, non-profit organizations, or any other organization. Documents utilized in the checking account function include checks, check account deposit slips, debit or credit slips which may be issued by the bank against the checking account, new account application forms, and forms for customers to reorder checks and deposit slips. The image scanner is capable of processing all of these documents to obtain the requisite information from the different documents, as will be described in more detail below for various documents. The documents may be received at an image scanner located at a teller line, a drive-up window, an ATM, or, alternatively, the documents may be received by mail. If received by mail, the bank employee may immediately run the documents through the image scanner without having to forward the documents to a central location for processing. The central accounting system maintains a record of all transactions regarding the checking account, balances, and tracks information associated with a particular check.

Savings accounts are another type of account for which the central accounting system processes information. Savings accounts typically receive some rate of interest on the balances held. Individuals may maintain interest-bearing savings accounts at a bank. Depending upon the terms, the time for which funds are committed to a savings account can vary in duration from immediate demand for withdrawal to as long as five years. When a customer agrees to leave the funds for a longer period of time, this usually provides the account with a higher interest rate. Documents used in a savings account transaction include, but are not limited to, deposit slips, withdrawal slips, new account application slips and debit or credit slips which may be applied against the account by the given banking institution. The image scanner is capable of imaging all of these documents. Again, the documents may be received at a teller line, drive-up window, ATM, or by mail, and may be immediately scanned at any point of entry without transporting the documents to a central location. The electronic data representing the images may be sent to a central accounting system where the data may be stored, analyzed and retrieved. The accounting system, in different embodiments, may compile statistics on customers and their accounts, maintain current balances, interest earnings, and available funds and advances, and record information concerning deposits and withdrawals.

Credit card accounts are another type of account handled by the central accounting system. When a credit card is used in a transaction, the bank typically receives a commission. The central accounting system maintains a record of the customer's credit limit, available credit, current balance, and payment. Preferably, the central accounting system does not settle the credit card balance until the end of the month, when the customer typically pays the balance due on the account. The debit card is similar to a credit card, but the customer's account is immediately debited when the transaction takes place.

Smart cards are a method of payment issued by banks, phone companies, and transit authorities for use by customers. The smart cards have a pre-stored value in place that a customer draws against. Consumers might deposit cash or write a check or submit a savings withdrawal document through the image scanner to purchase a smart card.

In certain embodiments, the central accounting system may also maintain records and manage information concerning mortgages, consumer loans, and student loans, such as the loan balance, last payment, interest rate, and amount paid.

The central accounting system may also distribute funds among the various accounts described above. For example, an individual, with checking and savings accounts at a bank, may also hold a mortgage with the bank. The central accounting system may make monthly withdrawals from the checking account or savings account to pay the monthly mortgage amount due the bank. To accomplish this, the customer may issue a check for payment and submit this against a coupon provided to the customer by the bank with the required monthly mortgage payment. The coupon and the check (or savings withdrawal and coupon) are run through the image scanner (at the teller line or automated teller). Both the images obtained by the image scanner and information derived from those images may be transmitted to the central accounting system that conducts the required transfers.

A customer may mail a check payment and loan coupon to the bank. Upon receipt, the bank employee immediately runs the check and coupon through the image scanner at any bank location-branch, central office, payment center, etc. The document does not have to be forwarded to a centralized proof department for handling.

In a like manner, businesses can borrow funds from banks for mortgages on commercial property. Again, monthly payments are required, and the business must withdraw funds from its checking account to make these monthly payments. A central accounting system may be utilized to make an electronic payment without the use of checks by using wire transfer or other methods, or the check for payment and the coupon may be scanned by the image scanner to obtain the payment amount, date and account number to be entered in the system. Alternatively, a bank customer may mail the check payment and loan coupon to the bank. Upon receipt, the bank employee immediately runs the check and coupon though the scanner at any bank location-branch, central office, payment center, etc. Thus, the document does not have to be forwarded to a centralized proof department for handling.

Consumer loan transactions, for example, involving auto loans, home improvement loans, and education loans, is another type of transaction that may be processed by the central accounting system in certain embodiments. Payments are typically made on a monthly repayment schedule by issuing monthly checks payable to the bank. Image scanning of the check and loan coupon may be utilized for this transaction. The payment may be processed as described above. Alternatively, the customer can mail a payment that the bank processes through its image scanners.

Various types of business loan transactions may also be processed by the central accounting system including a "bank line of credit" or "revolving loan." This type of loan is typically one year in maturity. A given business draws up to an authorized amount in a given year. For example, a business may have a line of credit with a bank for up to $2 million, and, on a daily basis, draw on this line of credit. The typical collateral provided for this type of loan includes accounts receivables, inventory, etc. As long as the business has receivables to support the loan, it can draw up to as much as the authorized amount. Then, when the financial position of the business improves, the business pays down this revolving loan either by issuing a check payable to the bank or through wire electronic transfer from the business's cash account to the loan payment. The image scanner may be used to accept such check payments, and the central accounting system at the bank processes these payments as described above.

Banks sometimes underwrite bonds or other issues of securities by corporations. For example, a business may hold an industrial revenue bond issued by a city in the amount of $1.5 million. However, in support of the business's credit, the bank guarantees payment if the business cannot perform. The business pays a small interest rate (for example, ¼ or 1% per year) for the bank's guarantee. Checks are one method used by banks for such payments. Therefore, the image scanner and central accounting system may be utilized to process this type of transaction, as described above.

Another service sometimes provided by the central accounting system for business accounts is cash management. This may be provided by lock box services or sweep accounts. For example, a business needs a minimum operating cash balance in its checking account each day to meet requirements for payments to vendors or employees, for example. Each day, hundreds of payments from various customers of the business are received, typically by check, and all these payments may be imaged both for storage and to permit the necessary information to be extracted and used in the accounting system. The checks are deposited into the general account of the business. When the business's account balances exceed its operating requirements, the central accounting system at the bank automatically "sweeps" extra funds from the non-interest-bearing account to an interest-bearing account such as commercial paper.

In a similar manner, many companies have customer payments directed to a bank lock box. This lock box address is at a bank location, and all customer payments to the company are diverted to this lock box address. This ensures that the payments are deposited as quickly as possible so that the bank's commercial customers have immediate use of the funds at the bank. The next day the central accounting system at the bank advises the business which payments were received into the account, and the business adjusts its accounts receivables balance one day later, creating a timing problem due to the delay.

The image scanner enables a business to scan the documents through the scanner at the business's location (thus, eliminating the need to first send payments to a bank lock box location) and receive immediate credit electronically through the central accounting system located at the bank. The images and/or information extracted from the images may be transmitted electronically to the bank as the scanning occurs. The check images and other images are immediately available via the central accounting system at the bank for settlement purposes. Therefore, lock box services by banks are handled on a de-centralized basis at bank customer locations.

Businesses often maintain cash balances invested in bank commercial paper. The bank, via the accounting system, pays interest daily on the cash balances. Deposits and withdrawals are typically handled by a pre-authorized officer of the company, such as the controller. Movement of funds typically requires written authorization, including a signature of the company officer. The image scanner and central accounting system may be utilized for withdrawals from commercial paper to a checking account, or for purchase of commercial paper. This may be initiated by inserting a pre-designed form with an area to add the amount field and authorized signature. The image scanner captures the amount and seeks a match for the signature.

Figure 3:
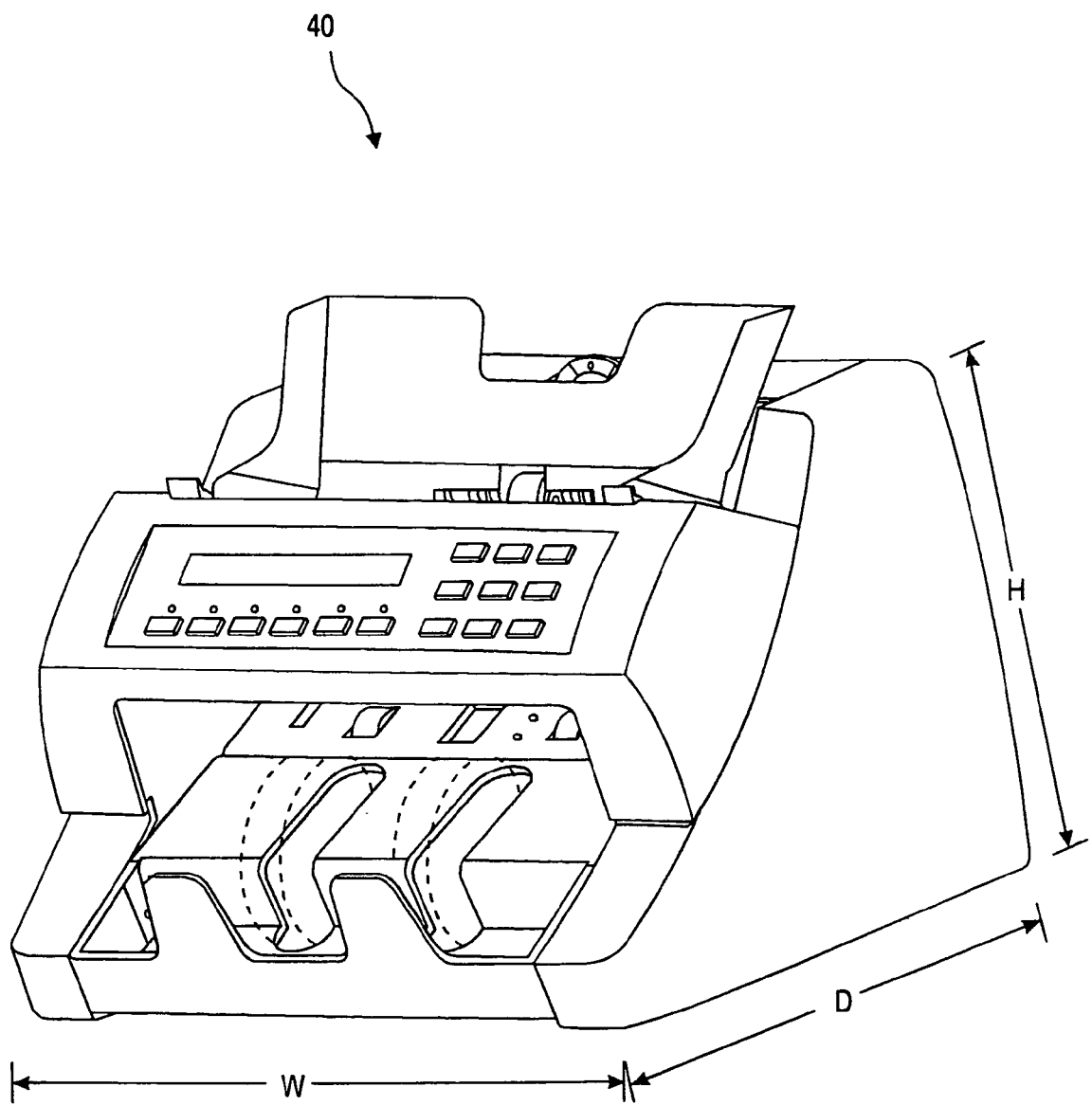
FIG. 3 is a perspective view of a compact document processor having a single receptacle for receiving processed documents.

A compact scanner 40 for use in automatically accepting documents, but without the capability of storing or automatically dispensing currency or other documents, is shown in FIG. 3. This particular scanner 40 has a single document output and may be located on a countertop or desktop at individual teller stations in banks, for example, where incoming documents may be manually removed from the machine after they have been processed by passing them through the machine. Currency may be dispensed manually, after passing it through the scanner 40 and inputting information such as the customer's identification, to make a record of the transaction. A preferred embodiment of the scanner 40 includes all the modules illustrated in the block diagram of FIG. 1 except the dispensing unit 21, the computers 32, 34 and 35, and the mass storage 33, and has a height H, width W and depth D of less than about 12 inches each.

Figure 4:
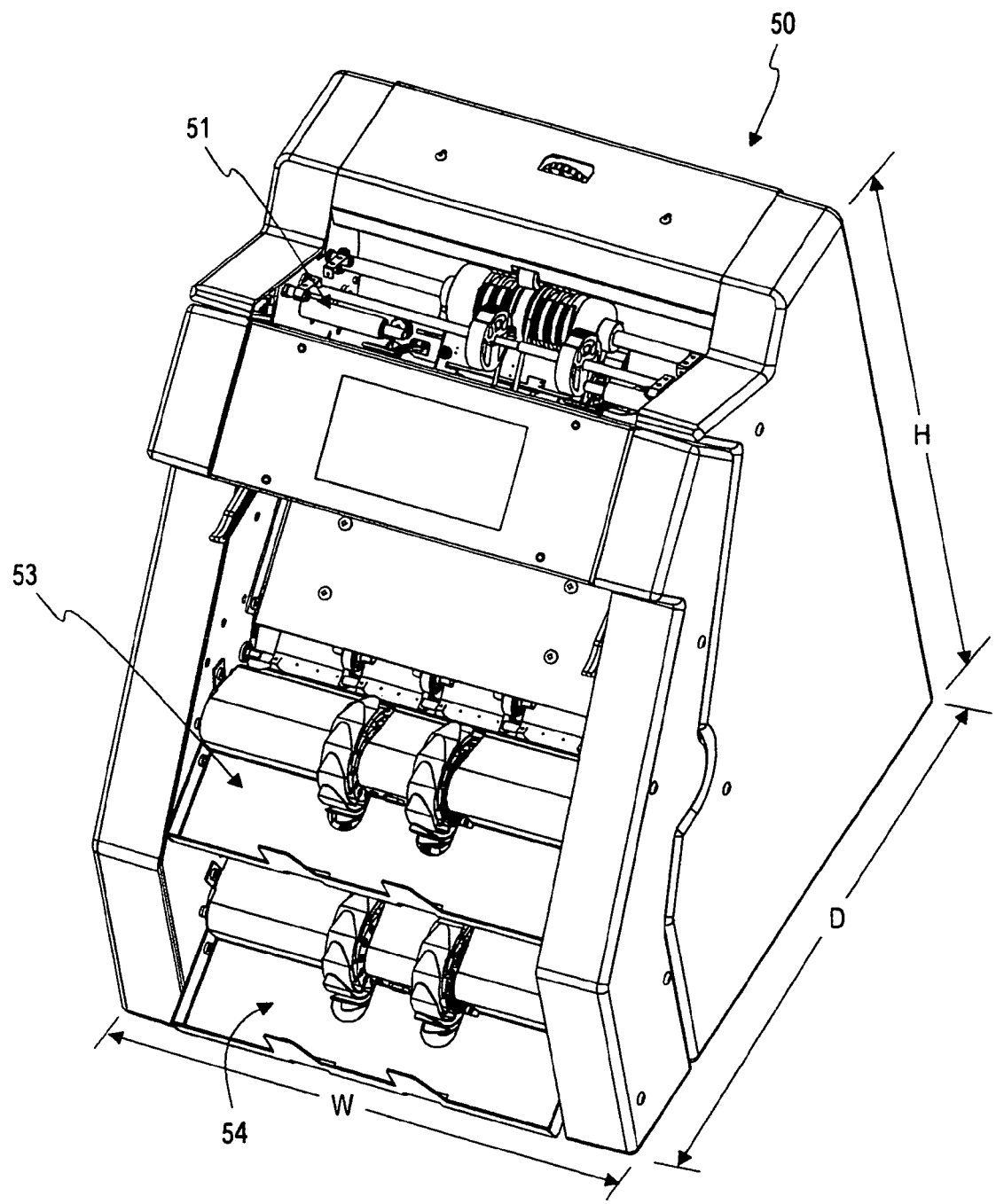
FIG. 4 is a perspective view of a compact document processor having two receptacles for receiving processed documents.
Figure 5:
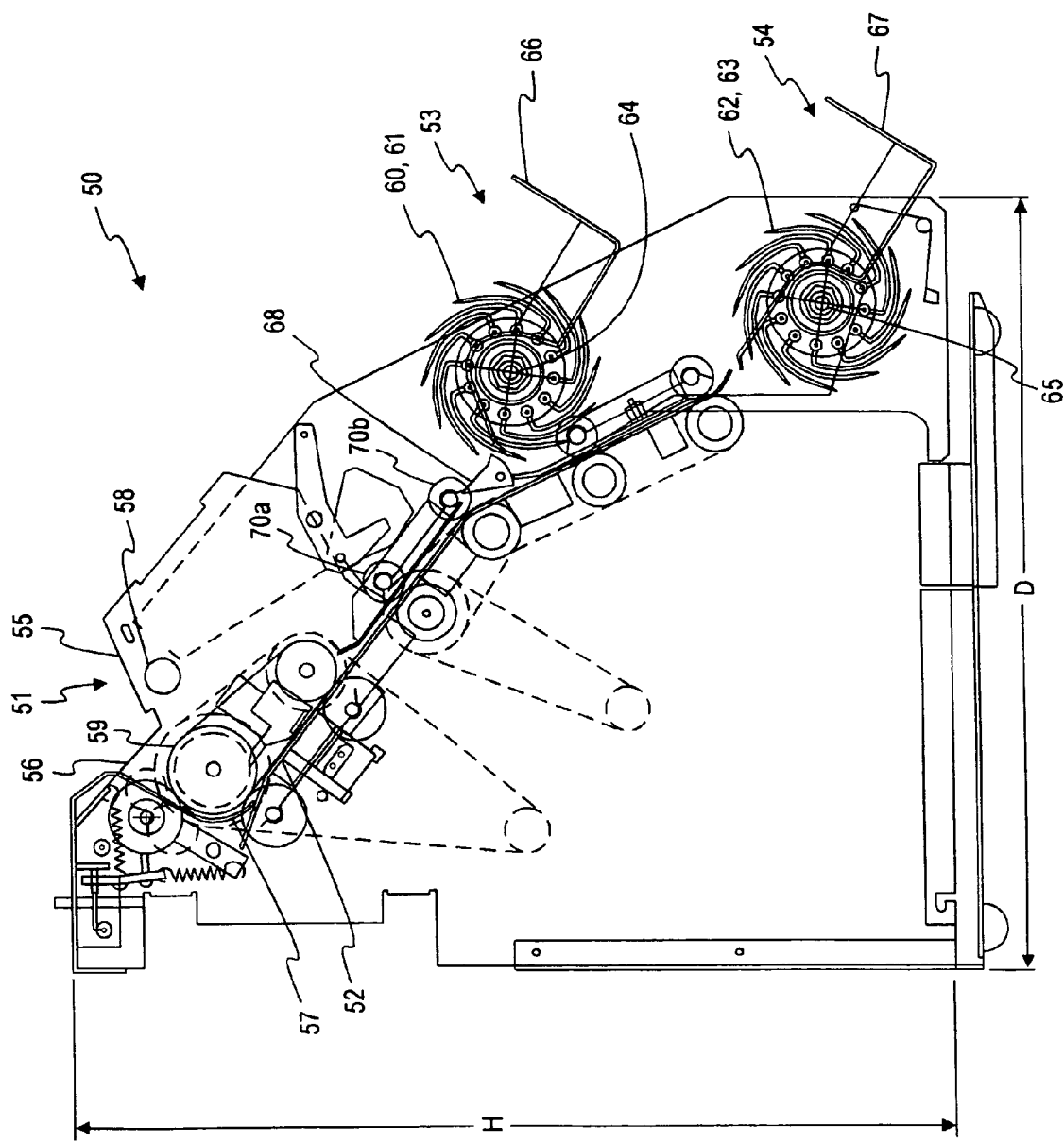
FIG. 5 is a side elevation of the processor shown in FIG. 3.

Another compact scanner 50, with two document outputs, is shown in FIGS. 4 and 5 and is described in detail in U.S. Pat. No. 6,311,819, which is incorporated herein by reference in its entirety. The transport system in the scanner 50 is one example of the transport mechanism 17 in the system of FIG. 1. A preferred embodiment of the scanner 50 has a height H of less than about 20 inches and a width W and depth D of less than about 15 inches each. As in the case of the scanner 40, a preferred embodiment of the scanner 50 includes all the modules illustrated in the block diagram of FIG. 1 except the dispensing unit 21, the computers 32, 34 and 35, and the mass storage 33.

The transport and processing system in the scanner 50 may be part of a large multi-function machine of the type illustrated in FIG. 2, for both accepting and dispensing currency bills and other documents, or it may be used in a small countertop or desktop machine, as shown in FIG. 3, that may be used at teller stations to immediately process incoming currency bills, checks and other documents, as well as outgoing currency.

Referring to FIGS. 4 and 5, a stack of incoming documents (or even a single document) is placed in an input receptacle 51 from which the documents are automatically fed one at a time into a transport mechanism that includes a transport plate or guide plate 52 for guiding documents to one of a pair of receiving receptacles 53 and 54. The transport mechanism preferably transports the documents at a rate of at least 800 documents per minute, and most preferably at least 1000 documents per minute. If desired, a faster rate may be used when only the denominating/authenticating unit is activated, and a slower rate when the image scanner, or both the image scanner and the denominating/authenticating unit, are activated. Before reaching the receiving receptacles 53, 54, a document may be imaged, evaluated, analyzed, authenticated, discriminated, counted and/or otherwise processed, and the results of such processing may be used to determine to which receptacle 53 or 54 a document is directed.

The input receptacle 51 for receiving a stack of documents to be processed is formed by downwardly sloping and converging walls 55 and 56 (see FIG. 4) formed by a pair of removable covers (not shown) which snap onto a frame. The wall 56 supports a removable hopper (not shown) that includes vertically disposed side walls (not shown). One embodiment of such an input receptacle is described and illustrated in more detail in U.S. Pat. No. 5,687,963, which is incorporated herein by reference in its entirety.

From the input receptacle 51, the documents are moved in seriatim from the bottom of the stack along a curved guideway 57 (shown in FIG. 5), which receives documents moving downwardly and rearwardly and changes the direction of travel to a forward direction. The documents are fed from the bottom of the stack to the curved guideway 57 by a stripping wheel mounted on a shaft 58. The curvature of the guideway 57 corresponds substantially to the curved periphery of a drive roll 59 so as to form a narrow passageway for the bills along the rear side of the drive roll. An exit end of the curved guideway 57 directs the documents onto the transport plate 52 which guides the documents through an evaluation section 71 and to one of the receptacles 53, 54.

In another embodiment, both the image scanner 18 and the discriminating and authenticating unit 19, each of which is described in more detail below, are mounted in the evaluation section 60. In an alternative embodiment, the image scanner 18 is mounted in the evaluation section 60 and the discriminating and authenticating unit 19 is mounted downstream of the image scanner, between the guide rolls 70a and 70b. In yet another alternative embodiment, the image scanner 18 also functions as the discriminating and authenticating unit, by using the electronic data representing the image to determine the denomination and authenticity of the documents. U.S. Pat. Nos. 5,680,472 and 5,729,623 describe systems for using image data to determine the denomination and authenticity of currency bills.

Stacking of the documents is accomplished by a pair of driven stacking wheels 60 and 61 for the first or upper output receptacle 53, and by a similar pair of stacking wheels 62 and 63 for the second or lower output receptacle 54. The stacking wheels 60-63 are supported for rotational movement about respective shafts 64 and 65 journaled on a rigid frame and driven by a motor (not shown). Flexible blades of the stacker wheels 60, 61 deliver the documents onto a forward end of a stacker plate 66. Similarly, the flexible blades of the stacker wheels 62, 63 deliver the bills onto a forward end of a stacker plate 67.

A diverter 68 directs the documents to either the first or second receptacle 53 or 54. When the diverter 68 is in a lower position, documents are directed to the first receptacle 53. When the diverter 68 is in an upper position, documents are directed to the second receptacle 54.

The documents may be diverted to different output receptacles based upon a variety of criteria. For example, the documents may be diverted to different output receptacles based upon the type of document, such as, bills to one output receptacle, checks or other non-currency documents to the other. In other embodiments, bills may be diverted to different output receptacles based upon denomination. In some embodiments, on-us checks may be diverted to one output receptacle, while transit checks are diverted to the other. Alternatively, in other embodiments, bills and/or other documents may be diverted based upon the country of origin, such as, U.S. bills and checks go into one output receptacle, and Canadian bills and checks go into another.

Currency bills are automatically denominated and authenticated as well as being imaged, and checks and other non-currency documents are simply imaged, all under the control of the controller 30. The controller 30 may be programmed to discard the images of documents recognized as genuine currency bills, or to extract prescribed information from such images and then discard them, or to transmit all the images to an archive. Alternatively, the controller 30 may transmit all the images to a central computer for further processing there.

Figure 6:
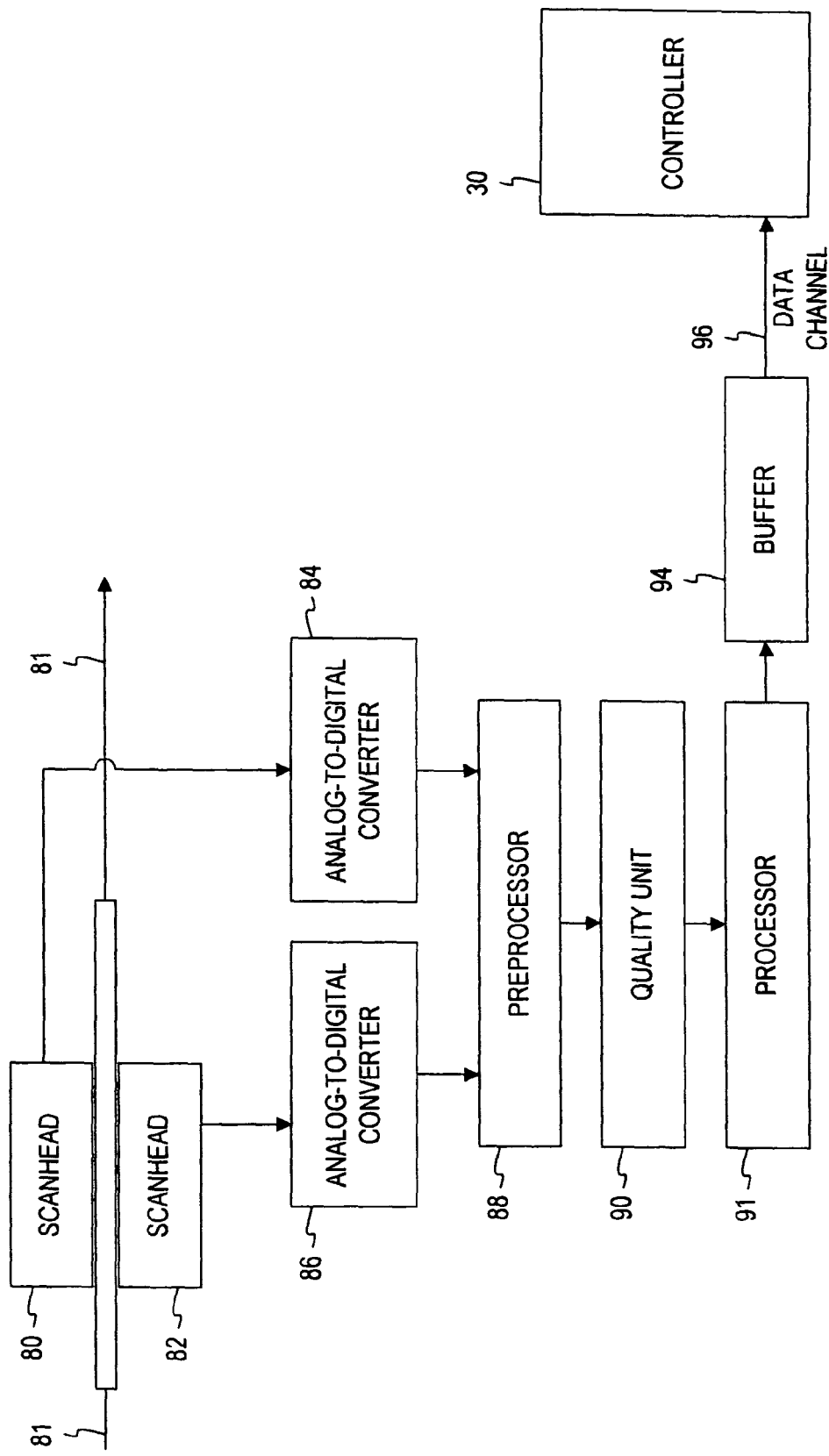
FIG. 6 is a block diagram of an image scanner for use in the present invention.

Another embodiment of the image scanner 18 will be described in more detail with reference to the block diagram of FIG. 6, although it will be understood that a variety of different image scanners may be used in the systems provided by this invention. The image scanner may be of the type disclosed in U.S. Pat. No. 4,888,812, which is incorporated herein by reference in its entirety. As shown in FIG. 6, the front and back surfaces of documents 81 are scanned by a pair of scanheads 80 and 82, which convert the images into electronic data representing those images. The scanheads 80 and 82 include electronic circuitry that generates a sequence of analog signals representing light and dark images defining the image on the document. The scanheads 80 and 82 are arranged for simultaneously scanning both the front and back surfaces of the documents and are connected respectively to analog-to-digital converters 84 and 86 which convert the analog values into discrete binary gray scale values of, for example, 256 gray scale levels. The scanheads 80 and 82 are capable of obtaining images of varying resolutions. The particular resolution chosen, which may be varied by the user, is selected based upon the type of document being scanned, as is known in the art. A preferred scanhead is the PI228MC-A4 Contact Image Sensor (CIS) Module made by Peripheral Imaging Corporation in San Jose, Calif., which contains the required light source, focusing optics, detector array and electronics for producing an analog video output containing 1728 pixels/line with a density of 200 pixels/inch.

The high resolution gray scale image data from the analog-to-digital converters 84 and 86 is directed to an image data preprocessor 88 in which the data may be enhanced and smoothed and which serves to locate the edges of successive documents and discard irrelevant data between documents. If the documents are slightly skewed, the image preprocessor 88 can also perform rotation of the image data to facilitate subsequent processing.

The image data output of the preprocessor 88 is monitored for unacceptable image quality by an image quality unit 90. For example, the image quality unit 90 monitors the distribution of gray scale values in the image data and creates a histogram. As is well known in the art, acceptable quality images have a distribution of gray scale values within certain prescribed limits. If the gray scale distribution of the histogram falls outside these limits, this is indicative of poor image quality and an error condition is generated.

The image data is transmitted from the quality unit 90 to a processor 91 that outputs the processed image data to a buffer 94 at the data input channel 96 to the controller 30. As mentioned above, OCR and/or ICR can use the image data to extract or capture specified information from specified fields of the image. For example, when processing checks, OCR can detect the "$" symbol as a coordinate to the left of the numeric check amount field box, and then extract the amount from that box. As is known in the art, a straight coordinate system or dimension system is used where known dimensions of the box are used to locate the field. Also, when scanning currency, OCR can detect the field where the serial numbers are printed and extract those numbers.

When scanning bar-coded documents, the scanhead may obtain an image of the bar-coded portion of the document and use the image to decipher the information from the bar code. For example, if a bar code is used to represent the value of the document (e.g., on a casino redemption ticket or a "Disney Dollar"), the scanhead may obtain an image of the bar code and then use that image to read the bar code and determine the value of the document, rather than reading the bar code directly from the document. Computer software for decoding bar-coded information from an image of the bar code is commercially available, such as, from VisionShape, Inc. of Placentia, Calif., or Kofax Image Products of Irvine, Calif.

The controller 30 may be programmed to locate fields for various types of currency and perform processing as follows. Based on scanning certain areas on the currency or document, the controller 30 first identifies the type of currency, for example, U.S. bills. Then, based on that identification, certain fields of interest are located, and the information in those fields is extracted and stored for use by the system. The controller 30 may also compress the image data, as is known in the art, for storage or in preparation for transmission to an outside location. Programs for extracting and storing information from prescribed fields in a document image are commercially available. For example, OCR and ICR engines for converting pre-defined characters or data fields into editable text and mapping it directly into a database are available from Mitek Systems, Inc. in San Diego, Calif. Check readers and OCR line readers are commercially available from a variety of sources. Programs for converting bitmap images of handwritten numeric amounts (such as, written on checks or other documents) into computer-usable character data are available from Orbograph Corporation in Billerica, Mass.

The amount of image data per document may vary depending upon the size and nature of the document, and the efficiency of any compression of the image data obtained by scanning that particular document. To ensure that no data is lost in the event that the volume of image data temporarily exceeds the transfer capacity of the high speed data channel, a pre-channel buffer 94 is interposed prior to the data channel 96, which is connected to the controller 30. The capacity of the pre-channel buffer 94 is continually monitored by the controller 30 so that appropriate action may be taken if the buffer becomes overloaded. The compressed video image data is received by the controller 30 over the high-speed data channel 96 and is initially routed to temporary storage. The image buffer is preferably of a size capable of storing the image data from at least several batches or runs of checks or similar documents. The controller 30 performs the functions of analyzing the data. Alternatively, as discussed above, analysis of the data can occur at the central office computer 32 or at a personal computer 34 attached to the system.

Other scanning modules and methods may be used in place of, or in addition to, the particular one described above. These include CCD array systems, multi-cell arrays and other well-known scanning techniques. Examples of these techniques and devices are described in U.S. Pat. No. 5,023,782; U.S. Pat. No. 5,237,158; U.S. Pat. No. 5,187,750; and U.S. Pat. No. 4,205,780, all of which are incorporated herein by reference in their entirety. The scanning module can also be a color image scanner such as the type described in U.S. Pat. No. 5,335,292, which is incorporated herein by reference in its entirety.

Figure 7:
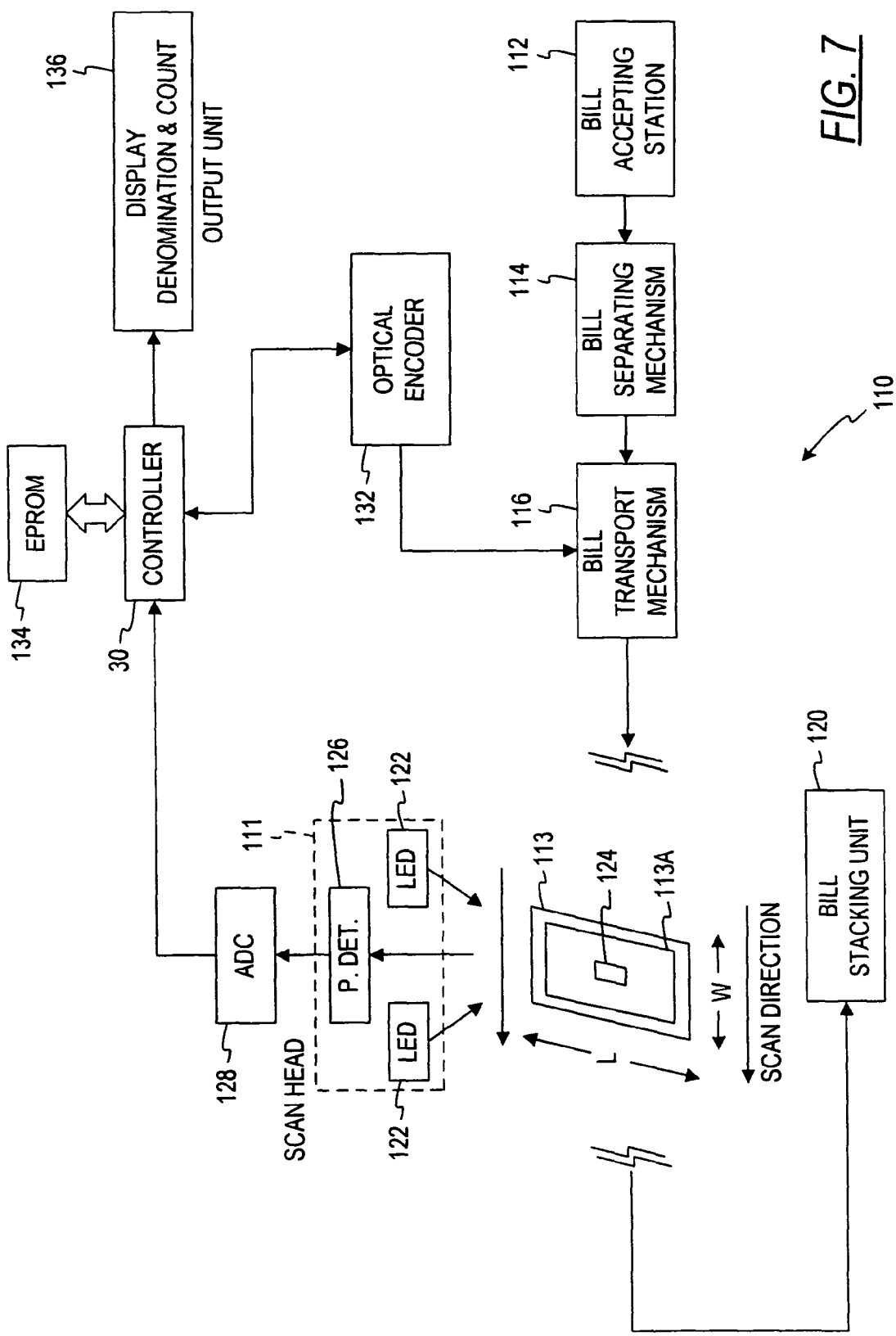
FIG. 7 is a block diagram of a currency bill discrimination and authentication unit for use in the present invention.

Another embodiment of the discrimination and authentication unit 18 will be described in connection with FIG. 7. This particular embodiment is described in detail in U.S. Pat. No. 6,337,921, which is incorporated herein by reference in its entirety. FIG. 7 is a block diagram of a currency discriminating unit 110 having a single scanhead 111. The unit 110 includes a bill-accepting station 112 where stacks of bills 113 that need to be identified and counted are picked up. A bill separating mechanism 114 separates one bill at a time by a transport mechanism 116 along a precisely predetermined transport path, across a scanhead 111 where the currency denomination of the bill is identified. A suitable transport mechanism has been described above. The scanhead 111 is an optical scanhead that scans for characteristic information from a scanned bill 113 that is used to identify the denomination of the bill. The scanned bill 113 is then transported to a bill stacking station 120.

The optical scanhead 111 of FIG. 7 comprises a pair of light sources 122 directing light onto the bill transport path so as to illuminate a substantially rectangular strip 124 on a bill 113 positioned adjacent the scanhead 111. Light reflected off the illuminated strip 124 is sensed by a photodetector 126 positioned directly adjacent the strip. The analog output of the photodetector 126 is converted into a digital signal by means of an analog-to-digital (ADC) converter 128 whose output is fed as a digital input to the controller 30.

While the scanhead 111 of FIG. 7 is an optical scanhead, it should be understood that it may be designed to detect a variety of different types of characteristic information from bills. Additionally, the scanhead may employ a variety of additional detection means such as magnetic, electrical conductivity, and capacitive sensors, as discussed in more detail below.

Referring again to FIG. 7, the bill transport path in this exemplary embodiment is defined in such a way that the transport mechanism 116 moves bills with the narrow dimension of the bills parallel to the transport path and the scan direction. As a bill 113 traverses the scanhead 111, the light strip 124 traverses the bill across the narrow dimension of the bill. As depicted in FIG. 7, the transport path is so arranged that a bill 113 is scanned by the scanhead 111 approximately along the central section of the bill along its narrow dimension, as shown in FIG. 7. The scanhead 111 functions to detect light reflected from the bill as it moves across the illuminated light strip 124 and to provide an analog representation of the variation in light so reflected which, in turn, represents the variation in the dark and light content of the printed pattern or indicia on the surface of the bill. This variation in light reflected from the narrow dimension scanning of the bills serves as a measure for distinguishing, with a high degree of confidence, among multiple currency denominations that the discrimination unit is programmed to handle.

A series of such detected reflectance signals are obtained across the narrow dimension of the bill, or across a selected segment thereof, and the resulting analog signals are digitized under control of the controller 30 to yield a fixed number of digital reflectance data samples. The data samples are then subjected to a normalizing routine that processes the sampled data for improved correlation and for smoothing out variations due to contrast fluctuations in the printed pattern on the bill surface. The normalized reflectance data represents a characteristic pattern that is unique for a given bill denomination and provides sufficient distinguishing features among characteristic patterns for different currency denominations. This process is more fully explained in U.S. Pat. No. 5,295,196 for a "Method and Apparatus for Currency Discrimination and Counting," which is incorporated herein by reference in its entirety.

In order to ensure strict correspondence between reflectance samples obtained by narrow-dimension scanning of successive bills, the initiation of the reflectance sampling process is preferably controlled through the controller 30 by means of an optical encoder 132 which is linked to the bill transport mechanism 116 and precisely tracks the physical movement of the bill 113 across the scanhead 111. More specifically, the optical encoder 132 is linked to the rotary motion of the drive motor which generates the movement imparted to the bill as it is relayed along the transport path. In addition, the mechanics of the feed and transport mechanism (see U.S. Pat. No. 5,295,196 referred to above) ensure that contact is maintained between the bill and the transport path, particularly when the bill is being scanned by the scanhead 111. Under these conditions, the optical encoder 132 is capable of precisely tracking the movement of the bill 113 relative to the light strip 124 generated by the scanhead 111, by monitoring the rotary motion of the drive motor.

The output of the photodetector 126 is monitored by the controller 30 to initially detect the presence of the bill underneath the scanhead 111 and, subsequently, to detect the starting point of the printed pattern on the bill, as represented by the thin borderline 113A which typically encloses the printed indicia on bills. Once the borderline 113A has been detected, the optical encoder 132 is used to control the timing and number of reflectance samples that are obtained from the output of the photodetector 126 as the bill 113 moves across the scanhead 111 and is scanned along its narrow dimension.

The use of the encoder 132 for controlling the sampling process relative to the physical movement of a bill 113 across the scanhead 111 is also advantageous in that the encoder 132 may be used to provide a predetermined delay following detection of the borderline prior to initiation of sampling. The encoder delay may be adjusted in such a way that the bill 113 is scanned only across those segments along its narrow dimension which contain the most distinguishable printed indicia relative to the different currency denominations.

In the case of U.S. currency, for instance, it has been determined that the central, approximately two-inch (5 cm) portion of bills, as scanned across the central section of the narrow dimension of the bill, provides sufficient data for distinguishing among the various U.S. currency denominations on the basis of the correlation technique disclosed in U.S. Pat. No. 5,295,196 referred to above. Accordingly, the encoder 132 may be used to control the scanning process so that reflectance samples are taken for a set period of time and only after a certain period of time has elapsed after detection of the borderline 113A, thereby restricting the scanning to the desired central portion of the narrow dimension of the bill.

The controller 30 is programmed to count the number of bills belonging to each currency denomination as part of a given batch of bills that have been scanned, and to determine the aggregate total of the currency amount represented by the scanned bills in that batch. The controller 30 is also linked to an EPROM 134 and an output unit 136 (FIG. 7) which provides a display of the number of bills counted, the breakdown of the bills in terms of denomination, and the aggregate total of the currency value represented by the counted bills. The output unit 136 can also be adapted to provide a print-out of the displayed information in a desired format.

The scanhead 111 may comprise multiple scanheads positioned next to each other, or a single stationary scanhead extending across the entire width of the documents being scanned. In this case, the same scanhead may be used to generate the data needed to denominate bills and to display and store the images that appear on bills and other types of documents. For example, the electronic data from a single scanhead may be used to denominate bills, and to store images of bills, checks and other documents. Alternatively, the same data may be used to also store images of only the serial numbers of bills. One example of such a full-width scanhead is the aforementioned P1228MC-A4 Contact Image Sensor (CIS) Module made by Peripheral Imaging Corporation in San Jose, Calif.

Two-sided scanning may be used to permit bills to be fed into a currency discrimination unit with either side face up, and also to permit high-speed scanning of images on both sides of the documents being scanned. An example of a two-sided scanhead arrangement is disclosed in U.S. Pat. No. 5,467,406, which is incorporated herein by reference in its entirety. Master patterns generated by scanning genuine bills may be stored for segments on one or both sides of bills of all denominations. In the case where master patterns are stored from the scanning of only one side of a genuine bill, the patterns retrieved by scanning both sides of a bill under test may be compared to a master set of single-sided master patterns. In such a case, a pattern retrieved from one side of a bill under test should match one of the stored master patterns, while a pattern retrieved from the other side of the bill under test should not match any of the master patterns. Alternatively, master patterns may be stored for both sides of genuine bills. In such a two-sided system, a pattern retrieved by scanning one side of a bill under test should match one of the master patterns for one side (Match 1) of a genuine bill, and a pattern retrieved from scanning the opposite side of the bill under test should match one of the master patterns of the opposite side of a genuine bill (Match 2).

A counterfeit detection function may also be included in the discrimination and authentication unit 19. A variety of different counterfeit detection techniques are well known and have been incorporated in currency discriminators. These known counterfeit detectors detect a variety of different types of characteristic information from currency bills, and employ a variety of different detection means such as magnetic, optical of capacitive sensors. These include detection of patterns of changes in magnetic flux, patterns of vertical grid lines in the portrait area of bills, the presence of a security thread, total amount of magnetizable material of a bill, patterns from sensing the strength of magnetic fields along a bill, and other patterns and counts from scanning different portions of the bill such as the area in which the denomination is written out. With regard to optical sensing, a variety of currency characteristics may be measured such as density, color, length and thickness, the presence of a security thread and holes, and other patterns of reflectance and transmission. Color detection techniques may employ color filters, colored lamps, and/or dichromic beam splitters. An optical sensing system using ultraviolet light is described in U.S. Pat. No. 5,640,463, incorporated herein by reference.

In addition to magnetic and optical sensing, other techniques of detecting characteristic information of currency include electrical conductivity sensing, capacitive sensing (U.S. Pat. No. 5,122,754 (watermark, security thread); U.S. Pat. No. 3,764,899 (thickness); U.S. Pat. No. 3,815,021 (dielectric properties); U.S. Pat. No. 5,151,607 (security thread)), and mechanical sensing (U.S. Pat. No. 4,381,447 (limpness); U.S. Pat. No. 4,255,651 (thickness)).

A UV authenticating technique may be employed along with one or more other authenticating and/or discrimination techniques in alternative embodiments of the imaging system. For example, the imaging system may include both a UV authenticating system and a magnetic authenticating system. It is known that genuine U.S. bills reflect a high level of UV light and do not fluoresce in response to UV illumination, except in certain special cases described below. An embodiment of the imaging system employing both UV and magnetic authentication would be able to detect a counterfeit U.S. bill that passes the UV authentication test (for example, it reflects a sufficient level of UV light and does not fluoresce in response to UV illumination), but fails the magnetic authentication test. In other words, an exemplary embodiment of the imaging system that implements a plurality of authentication tests is able to detect counterfeit bills that would otherwise go undetected where only one authenticating test is employed. Further details of a currency processing system employing UV, fluorescence and magnetic authentication tests are described in detail in U.S. Pat. No. 6,363,164, which has been incorporated by reference.

Security features added to U.S. currency beginning with the 1996 series $100 bills include the incorporation into the bills of security threads that fluoresce under ultraviolet light. For example, the security threads in the 1996 series $100 bills emit a red glow when illuminated by ultraviolet light. The color of light emitted by security threads under ultraviolet light will vary by denomination. For example, with the $100 bills emitting red light and the $50 bills emitting, blue or purple light. Thus, the red light emitted from the security thread of a $100 bill, in response to UV illumination may be used to both authenticate and denominate that bill.

Additionally, the location of the thread within the bill may be used as a security feature. For example, the security threads in all $100 bills are located in the same position. Furthermore, the location of the security threads in other denominations will be the same by denomination and will vary among different denominations. For example, the location of security threads in $10, $20, $50 and $100 bills may each be distinct. In such a situation, the presence of a security thread in a specific location may be used to identify the denomination of the bills. Alternatively, the location may be the same in the $20s and the $100s but different from the location of the security threads in the $50s. According to alternative embodiments, the imaging processing system includes sensors to evaluate the features of security threads, including location, in currency bills. A currency processing system for evaluating the authenticity of currency bills based on the fluorescence of security threads under UV illumination and the location of the security threads within the bills is described in U.S. Pat. No. 6,363,164 B1, which has been incorporated herein by reference.

Additionally, sensors may be employed to detect bills or security threads printed or coated with thermochromic materials (materials that change color with a change in temperature). Examples of threads incorporating thermochromic materials are described in U.S. Pat. No. 5,465,301, incorporated herein by reference.

The issuance of an error code such as a no-call code or a suspect code may be used to suspend processing of a stack of bills such that the bill triggering one of these codes is the last bill delivered to a receiving receptacle before the operation of the system is suspended. Accordingly, the triggering bill may be examined by the operator of the system so that appropriate action may be taken based on the operator's evaluation of the triggering bill. Alternatively, in a system having two or more receiving receptacles, the issuance of one of these error codes may cause the triggering bills to be diverted to a different receptacle such as a reject receptacle, or bills that result in a no-call code may be diverted to one receptacle and those that result in a suspect code may be diverted to a different receptacle. Accepted bills may be routed to one or more other receptacles. When the currency bill that triggers a suspect code has been imaged, the electronic data representing that image may be retained in association with an identification of the customer who deposited that bill, so that the account of that customer may be debited in the event the bill is confirmed to be a counterfeit.

Figure 8:
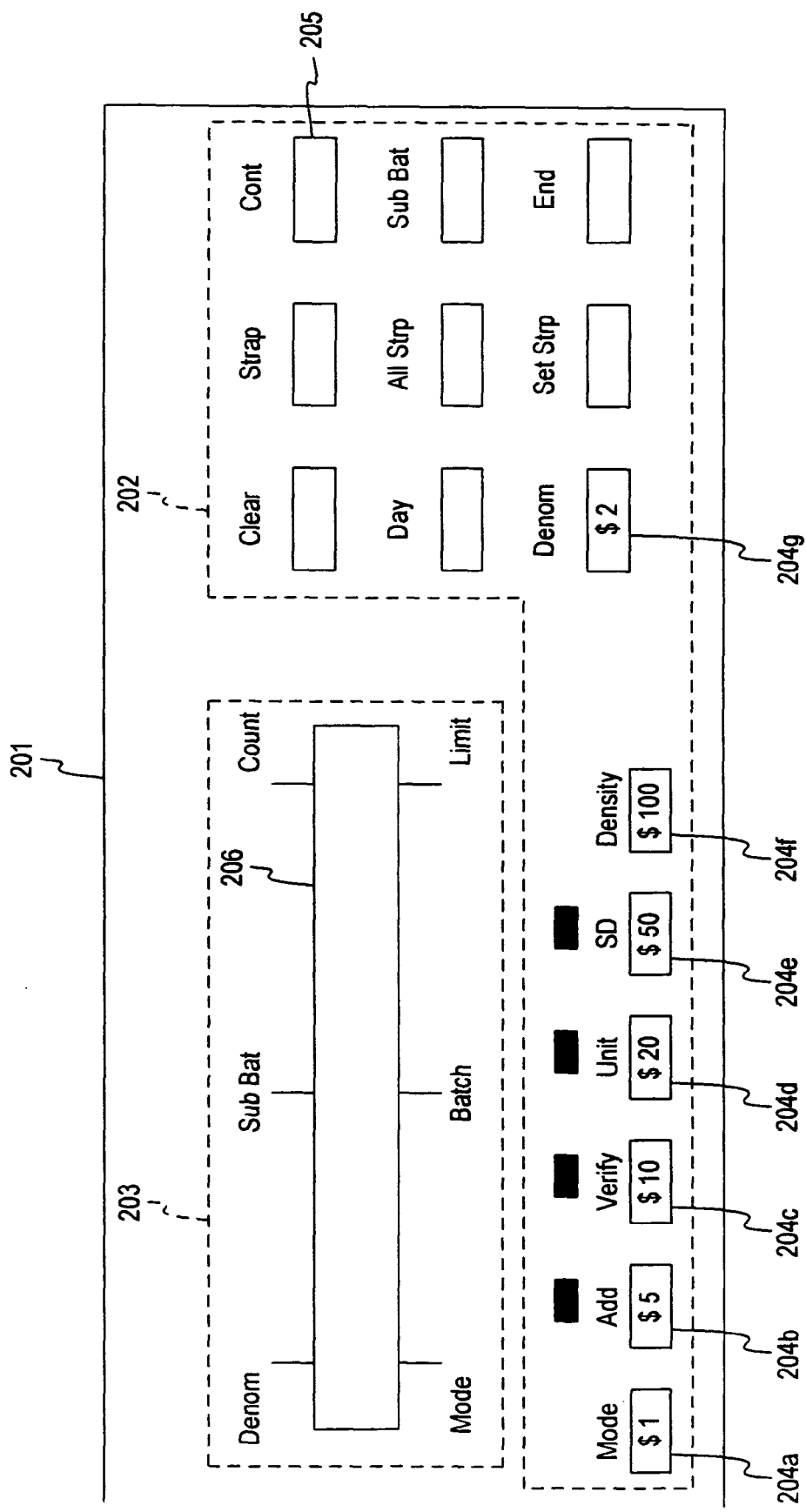
FIGS. 8-10 are plan views of representative control panels for use on the customer interface unit used in the present invention.

The operation of a communications panel 10 will now be described in more detail in conjunction with FIG. 8 which illustrates a front view of one example of a control panel 201. The control panel 201 comprises a keypad 202 and a display 203. The keypad 202 comprises a plurality of keys including seven denomination-selection elements 204a-204g, each associated with one of seven U.S. currency denominations— $1, $2, $5, $10, $20, $50 and $100 bills. Alternatively, the keys may be for £2, £5, £10, £20 and £50 bills or any other combination of foreign currency. For document processing systems, the denomination selection elements may be labeled according to the currency system which a system is designed to handle, and there may be more or less than seven denomination-selection elements.

The $1-denomination selection key 204a may also serve as a mode-selection key. It should be noted that the denomination-selection elements may be used to enter not only the value of currency, but all types of documents including checks. The keypad 202 also includes a continuation selection element 205. Various information such as instructions, mode-selection information, authentication and discrimination information, individual denomination counter values, and total batch counter value are communicated to the operator via an LCD 206 in the display 203. The image processing unit and the discrimination and authentication unit may have a number of different operating modes, including a mixed mode, a stranger mode, a sort mode, a face mode, and a forward/reverse orientation mode.

Figure 9:
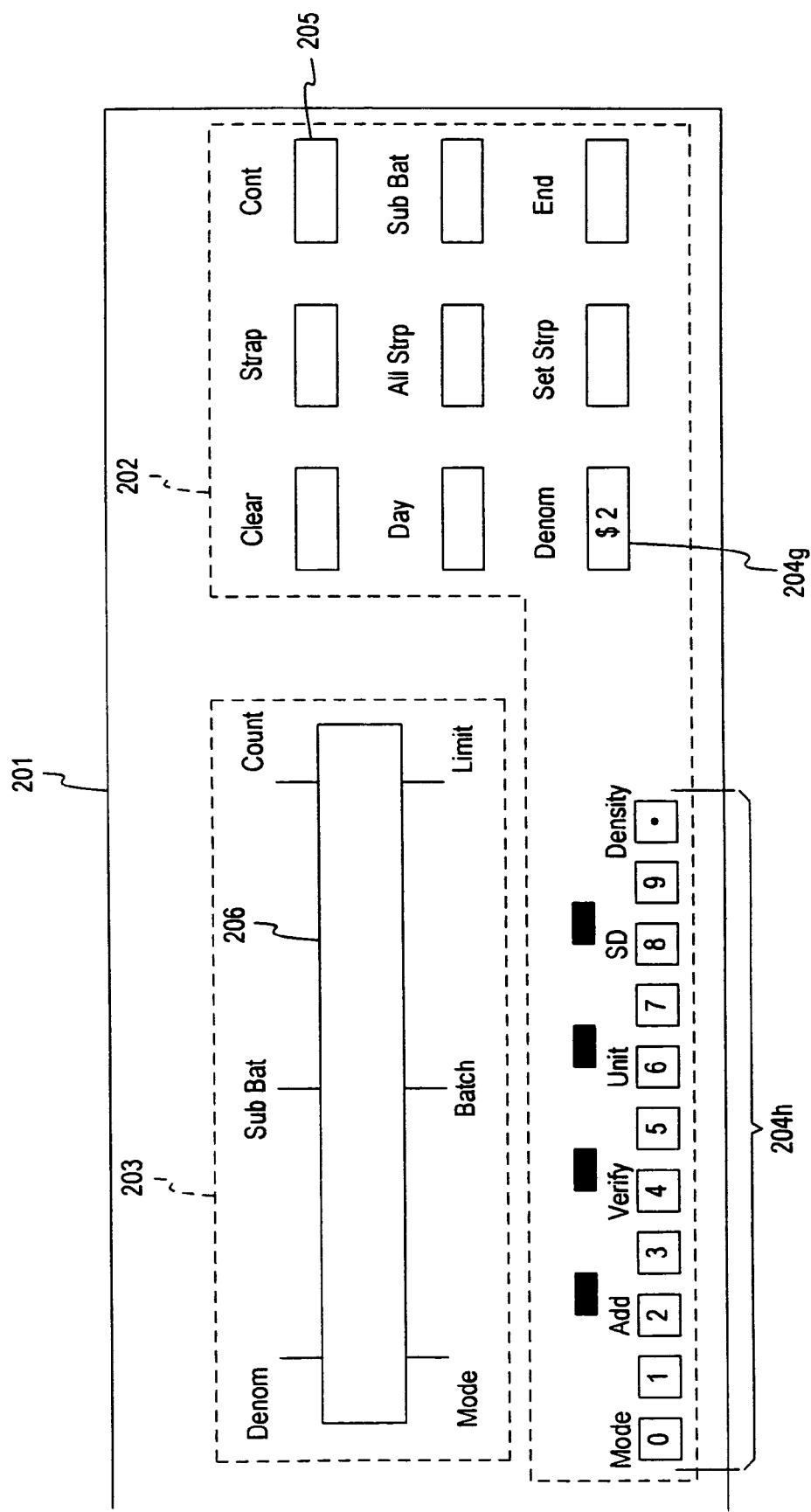
Figure 10:
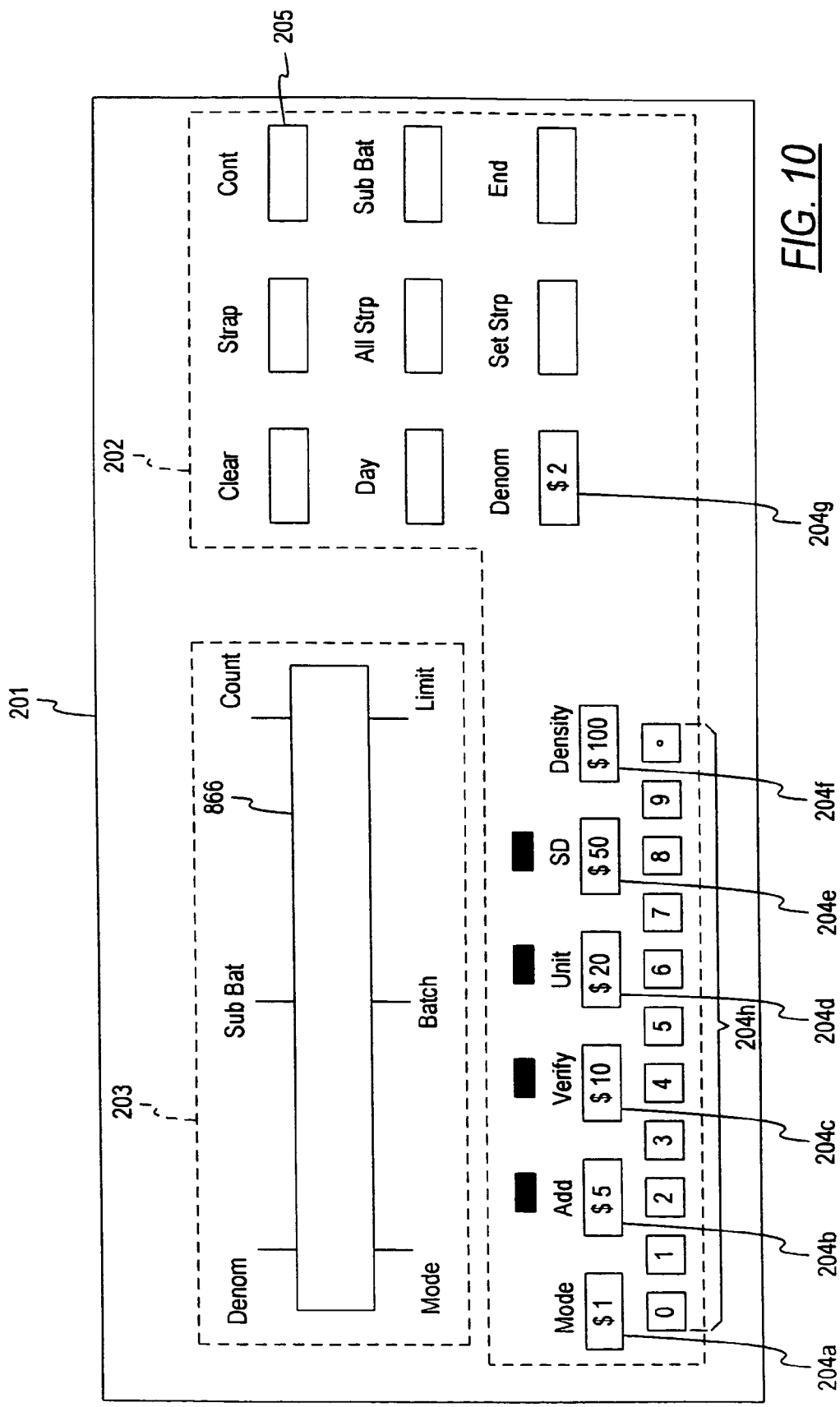

FIG. 9 illustrates an alternate embodiment of the control panel 201. A set of numeric keys with a decimal point collectively labeled 204h is engaged by the user to enter numeric data from all types of documents. FIG. 10 illustrates a control panel 201 with both numeric keys and decimal point 204h and denomination keys 204a-204f. The user has the choice of entering the data by the denomination keys 204a-204f or the numeric keys. The remaining elements of the control panels in FIGS. 8 and 9 function as described above.

The operation of a document processing system having the denomination selection elements 204a-204g and the continuation element 205, in connection with several operating modes is described in detail in U.S. Pat. No. 6,278,795 which is incorporated herein by reference in its entirety.

The control panels discussed above may be modified to facilitate the processing of documents in various alternative embodiments, including different embodiments for reconciling bills triggering error conditions such as a no-call error signal. When reconciling no-call bills, the operator inputs the value of the bill that triggered the no-call error signal, causing that bill to be included in the various totals maintained by the imaging system. According to one alternative embodiment, the control panel 1061 includes backlit denomination keys 204a-f, or light elements corresponding to each denomination key 204a-g, that are individually selectively illuminated for suggesting a denomination of a bill to an operator in response to a no-call error signal. Alternatively, the control panel 1061 can include a "YES" key and a "NO" key for inputting an operator's response to a displayed denomination suggestion. In yet another alternative embodiment, the control panel includes a scroll key that allows an operator to scroll though a plurality of displayed denominations and does not include individual denomination keys. In still another alternative embodiment, the control panel includes a touch screen interface. A plurality of alternative embodiments of the control panel 1061, including a touch screen, are described in detail in U.S. Pat. No. 6,363,164, which is incorporated herein by reference in its entirety. The structure and operation of the screens are described and illustrated, for example, in U.S. Pat. Nos. 5,317,140; 5,297,030; 5,231,381; 5,198,976; 5,184,115; 5,105,186; 4,931,782; 4,928,094; 4,851,616; 4,811,004; 4,806,709 and 4,782,328, which are incorporated herein by reference in their entirety.

Figure 11A:
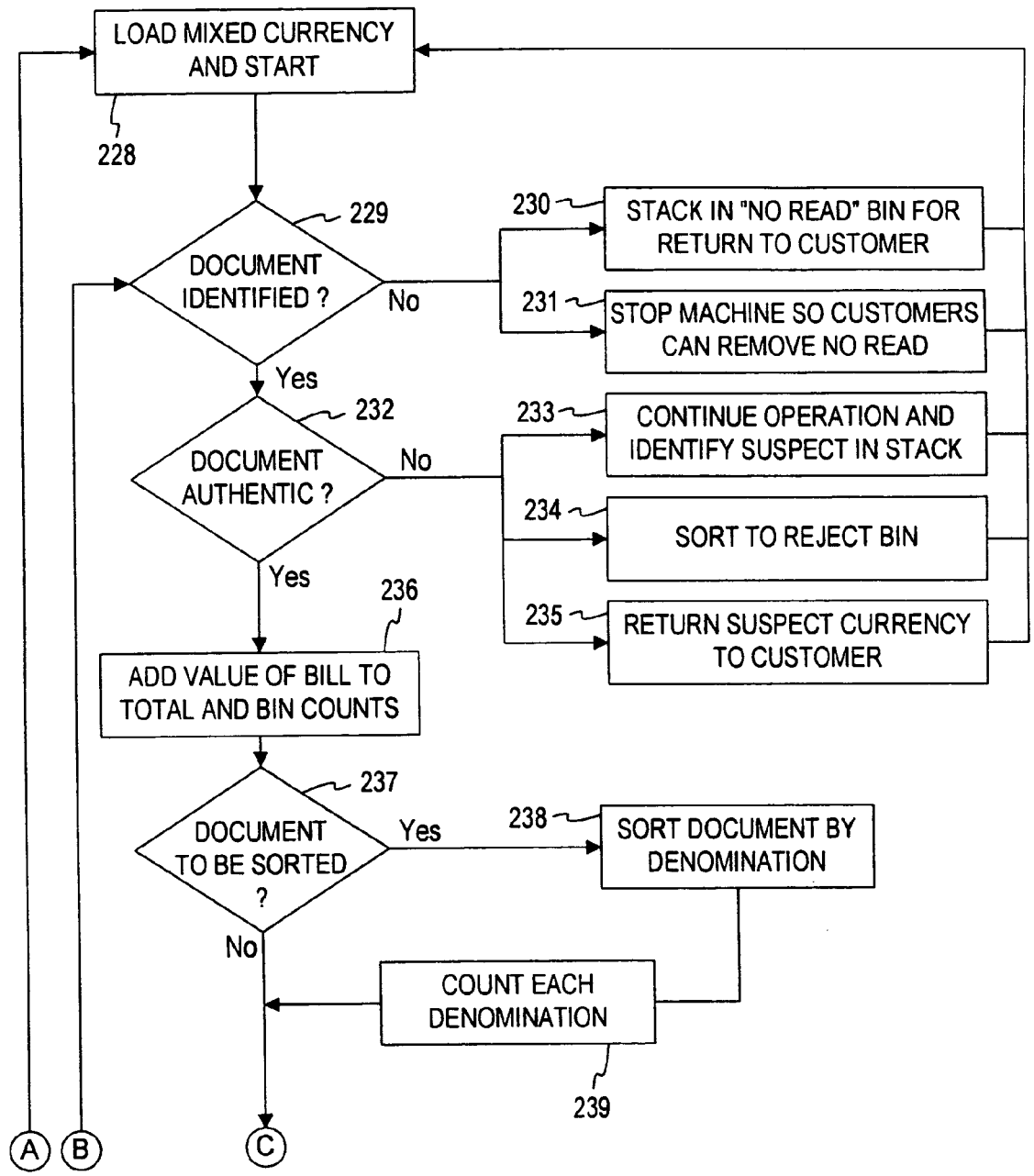
FIGS. 11*a*-11*b* are flowcharts of a method of conducting a document transaction using the system of the present invention.
Figure 11B:
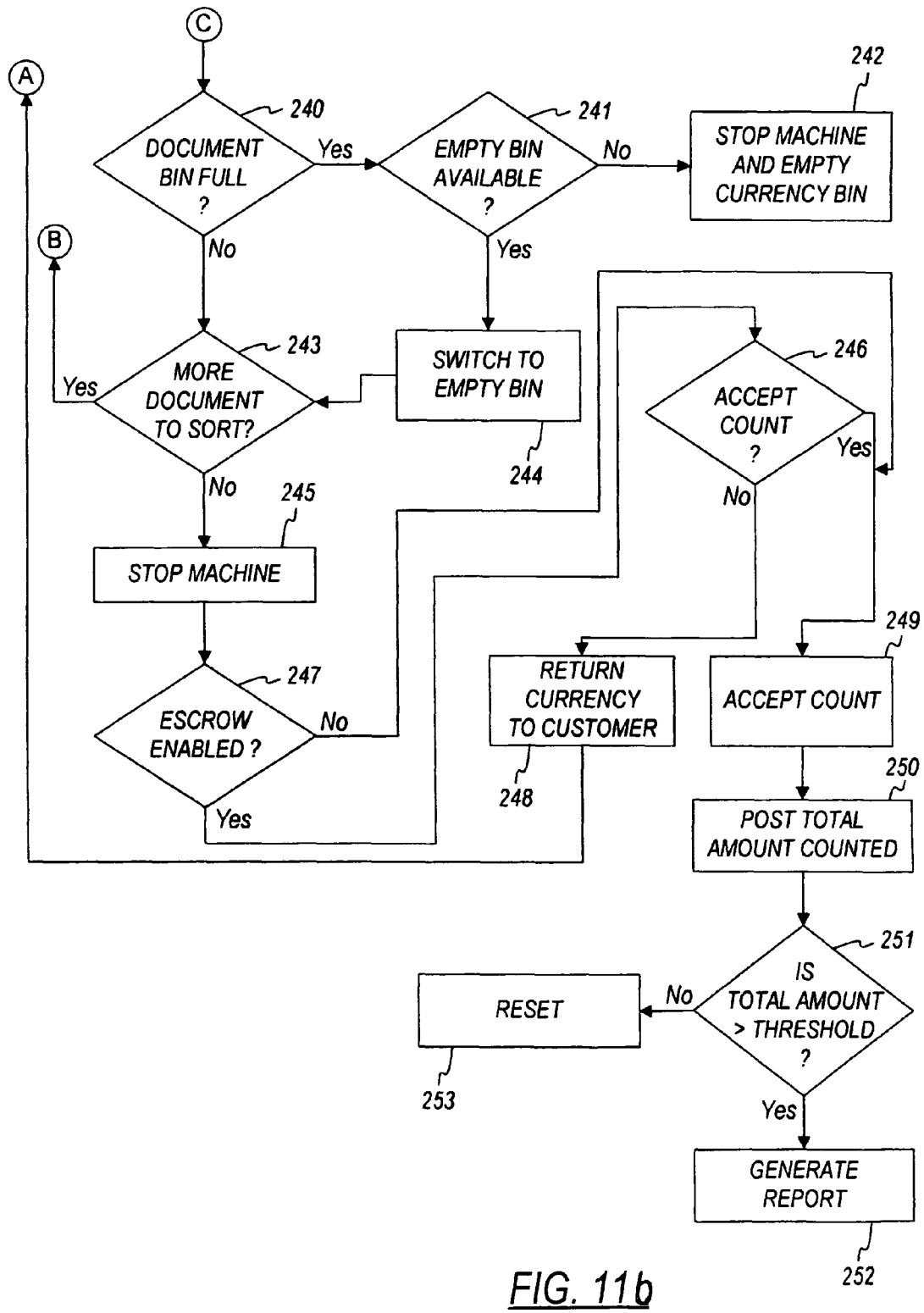

The details of conducting a document transaction are illustrated in FIG. 11a and FIG. 11b. The functionality described below may reside at a single location or may be distributed among several locations throughout the document processing system, for example, in the full image scanner, at the central office computer, and at a personal computer attached to the document processing system. The user loads mixed documents into the machine at step 228. This may be accomplished, as discussed above, by placing the documents in receptacle 16 on the machine and initiating the processing of the documents. For example, the user may press a start key on a touch screen on the communications panel 26, as discussed above, to initiate a transaction. By "document transaction," it is meant to include not only all documents as described above, but also all forms of storage media, such as, smart cards, debit cards, CD disks. Stored on the media is an amount indicating an amount of funds.

The machine attempts to identify the document at step 229. If step 229 fails to identify the document, several alternatives are possible depending upon the exact implementation chosen for the machine. For example, as described previously, if it fails to identify the document, the system can use two canisters and place an unidentified document in a "no read" canister. Alternatively, at step 231, the machine may be stopped so that the user can remove the "no read" document immediately. In this alternative embodiment, if the document can not be recognized by the machine, the unidentified document is diverted, for example, to a return slot so that it may be removed from the machine by the user. Also, the image may be displayed on the teller's video terminal so that the teller can analyze the image without removing the document. Alternatively, the teller may physically remove the document from the output receptacle, inspect the document and then enter the missing data so that the document may be processed. For example, if the amount of a check or the denomination of a bill could not be determined by the machine, the teller may enter the amount via a control panel, as discussed above. After completing these steps, the system returns to step 229 to identify the other loaded documents.

In the event that the user wishes to deposit "no read" documents that are returned to the user, the user may key in the value and number of such document and deposit them in an envelope for later verification. A message on the display screen may advise the user of this option. For example, if four $10 bills are returned, then re-deposited by the user in an envelope, the user may press a "$10" key on the keyboard four times. The user then receives immediate credit for all the documents denominated and authenticated by the scanner. Credit for re-deposited "no read" documents is given only after a bank picks up the envelope and manually verifies the amount. Alternatively, at least preferred users may be given full credit immediately, subject to later verification, or immediate credit may be given up to a certain dollar limit. In the case of counterfeit documents that are not returned to the user, the user may be notified of the detection of a suspected counterfeit document at the machine or later by a written notice or personal call, depending upon the preferences of the financial institution.

If step 229 identifies the documents at step 232, the machine attempts to authenticate the documents to determine if the documents are genuine. If the documents are not genuine, then the system proceeds to one of three steps depending upon which option a user chooses. At step 233, the system may continue operation and identify the suspect documents in the stack. In this alternative, a single canister is used for all documents, regardless of whether they are verified bills, no reads, or counterfeit suspects. On the other hand, at step 234 the machine may outsort the currency, for example, to a reject receptacle. The machine may also return suspect currency at step 235 directly to the user. This is accomplished by diverting the currency to the return slot. Also, the machine maintains a count of the total number of counterfeit documents. If this total reaches a certain threshold value, an alarm condition will be generated. The alarm condition may be handled, for example, by turning on a light on the machine or by alerting the central office.

As mentioned above, the system may use a single canister to hold the documents. If a single canister system is used, then the various documents may be identified within the single canister by placing different colored markers at the top of different documents. These markers are inserted into the bill transport path so they follow the respective bills to be inserted into the canister. Specifically, a first marker, such as a marker of a first color, is inserted to indicate the document is a counterfeit suspect that is not to be returned to the user. A second type of marker, such as, a marker of a second color, is inserted to indicate that the document is a no-call. A third type of marker, such as, a third color, is inserted to indicate that a marked batch of documents represents a deposit whose verified amount did not agree with the user's declared balance. Because this third type of marker identifies a batch of documents instead of a single document, it is necessary to insert a marker at both the beginning and end of a marked batch. The marker can vary in size, contain bar-codes, or vary in color to easily identify different types of documents such as checks and currency.

If the document is authenticated, the total count $B_{total}$ and receptacle or "bin" count $B_{count i}$ (where "i" is the "ith" receptacle) are incremented at step 236. The total count $B_{total}$ is used by the machine to establish the amount deposited by the user, and the receptacle counts are used to determine the amount in a particular receptacle.

The machine then determines whether sorting is required at step 237. If the answer is affirmative, then the document is sorted by denomination at step 238. Rather than using single or double receptacles, as described above, this option includes a receptacle for each denomination and a receptacle for each type of document such as checks and loan coupons. A receptacle may also be designated to receive a combination of documents. For example, one receptacle may be designated for proof-of-deposit documents such as checks, loan coupons, and savings deposit slips. Sorting is accomplished by a sorting and counting module which sorts the documents placing each denomination in a specific receptacle. The sorting algorithm used may be any of those well known in the art.

After sorting at step 238 or if the answer to step 237 is negative, the machine proceeds to step 240. At step 240, the machine tests if the document receptacle in use is full. That is, the machine compares $B_{count i}$ to the maximum allowed for that receptacle. If it is full, at step 241, the machine determines if there is an empty document receptacle available. If there is no empty document receptacle available, at step 241, the machine stops. The full receptacle is emptied at step 242. If an empty document receptacle exists, the machine switches to the empty receptacle and places the document into that receptacle at step 244. At step 243, the system determines when the last document in the deposited stack of documents has been counted. If counting is complete, the machine is stopped at step 245.

The transport mechanism may also include an escrow holding area where the document being processed in a pending deposit transaction is held until the transaction is complete. Thus, from step 245, the system proceeds to step 247, to determine if escrow has been enabled. If escrow has not been enabled, the count of the machine is accepted at step 249, and the total amount $B_{total}$ is posted to the user at step 250. If escrow has been enabled, at step 244, the user is given the choice of accepting the count. If the user decides not to accept the count, at step 248, the document is returned to the user. From step 248, the machine proceeds to step 228 where the user is given another chance of counting the document. If the user decides to accept the count at step 246, the machine proceeds to step 249 where the count is accepted and step 250 where the total count is displayed to the user. At this point, the document counting transaction is complete.

At step 251, the system determines whether the total amount of currency counted in the completed transaction is greater than a prescribed threshold amount, above which a government report is required. If the answer at step 251 is affirmative, the system generates the required report at step 252, storing and printing a report identifying the customer, the account, the amount of the deposit, the number of bills of each denomination included in the deposit, the responsible teller and any other information required by the particular law or government regulation requiring the report. If the answer at step 251 is negative, the system is reset at step 253 to await the next transaction.

Figure 12:
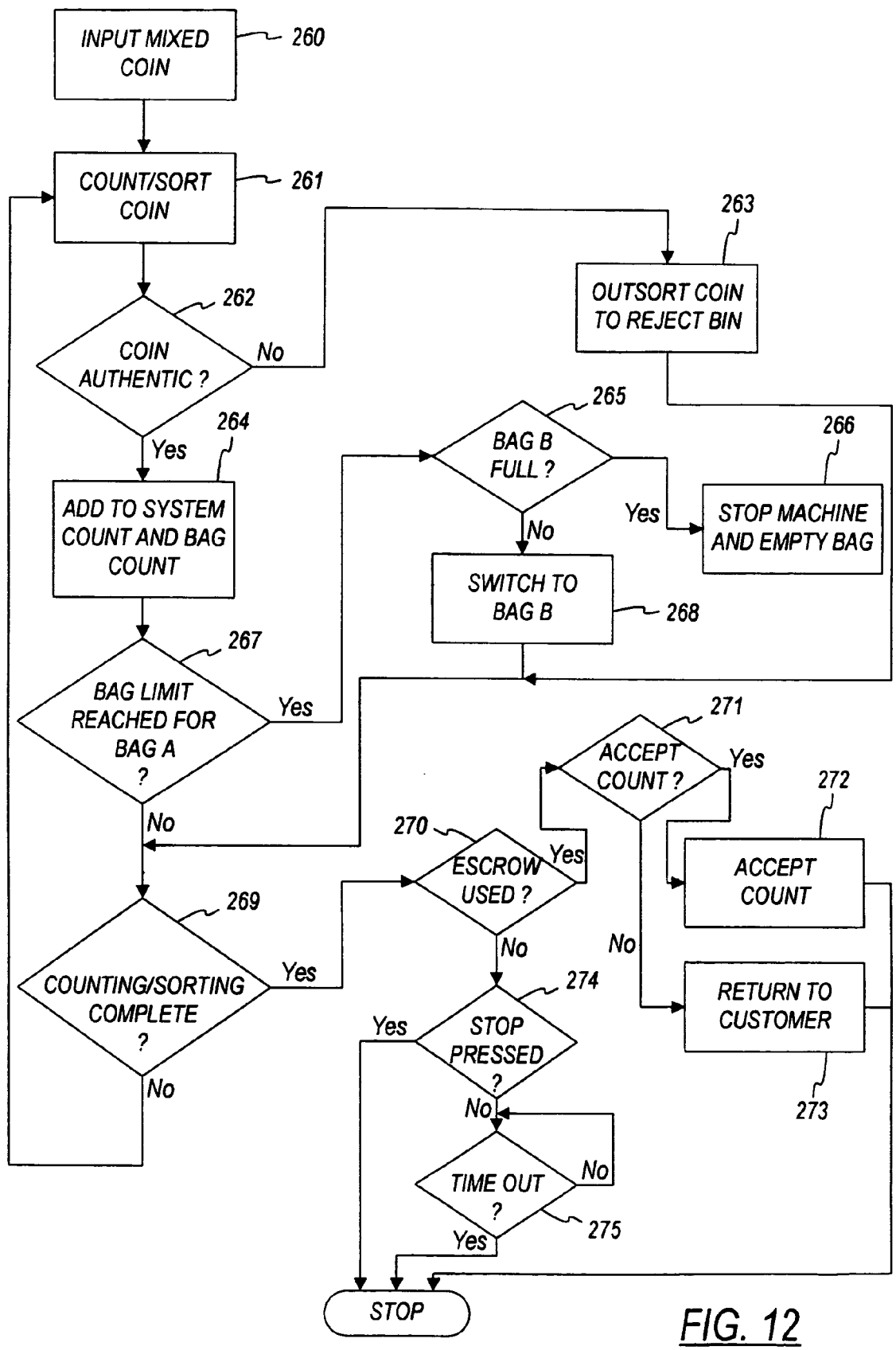
FIG. 12 is a flowchart of a coin processing algorithm for use in the system of the present invention.

A coin transaction is described in greater detail in FIG. 12. As shown, a customer loads mixed coins into the system at step 260. The coins are sorted, authenticated, and bagged one at a time. At step 261, the machine sorts the coin. The sorting process is described in greater detail below. At step 262, the machine determines if the coin is authentic. This process is also described in greater detail below. If the coin is not authentic, the machine outsorts the coin to a reject receptacle at step 263 and then proceeds to step 268 and determines if counting and sorting is complete.

If the coin is authentic, the coin count $C_{total}$ and bag count $C_{bag i}$ (where "i" represents the "ith" bag) is incremented by one at step 264. The system count $C_{total}$ represents the total value of the coins deposited, while the bag count represents the number of coins in a bag. After sorting and authenticating the coin, the system attempts to place the coin in a bag at step 267. All coins may be placed in one bag, or one bag per denomination may be used. Alternatively, any number of denominations, for example, two, may be placed in a bag. At step 267, the system checks to see if the limit of the bag has been reached. That is, the system compares $C_{bagi}$ to the predetermined limit for that bag. If the limit has been reached for the bag in current use (bag A), the machine next checks to see if another bag (bag B) is full at step 265. If bag B is full, the machine is stopped and an operator empties the bag at step 266. If the other bag (bag B) is not full, then at step 268 the machine switches to this bag and the coin is placed there. The machine then proceeds to step 269 where a test is performed to determine if counting is complete.

At step 269, the machine determines if sorting is complete. This is accomplished by sensing whether there are additional coins to sort in the coin receptacle. If sorting is not complete, the system continues at step 261 by counting and sorting the next coin. If sorting has been completed, at step 270 the machine checks whether the escrow option has been enabled. If it has, at step 271, the machine asks whether the customer wishes to accept the count. If the customer replies in the affirmative, at step 272 the machine accepts the count $C_{total}$ and posts the total to the customer. If the customer replies with a negative answer at step 271, then the machine returns the coins to the customer at step 273, and the counting is complete.

If escrow has not been enabled, the machine checks at step 274 to see if stop has been pressed. If it has, the machine stops. If stop has not been pressed, then the machine waits for a certain period to time out at step 275 and stops when this time period has been elapsed.

As described above, the processing system utilizing image scanning and a discriminator has the advantage of being able to process mixed currency or documents. The deposits in the system are processed substantially immediately. In addition, the images of the scanned documents may be communicated to a central office from which two-way communication is allowed. Finally, the processing system provides all the benefits of an automated teller machine.

Figure 13:
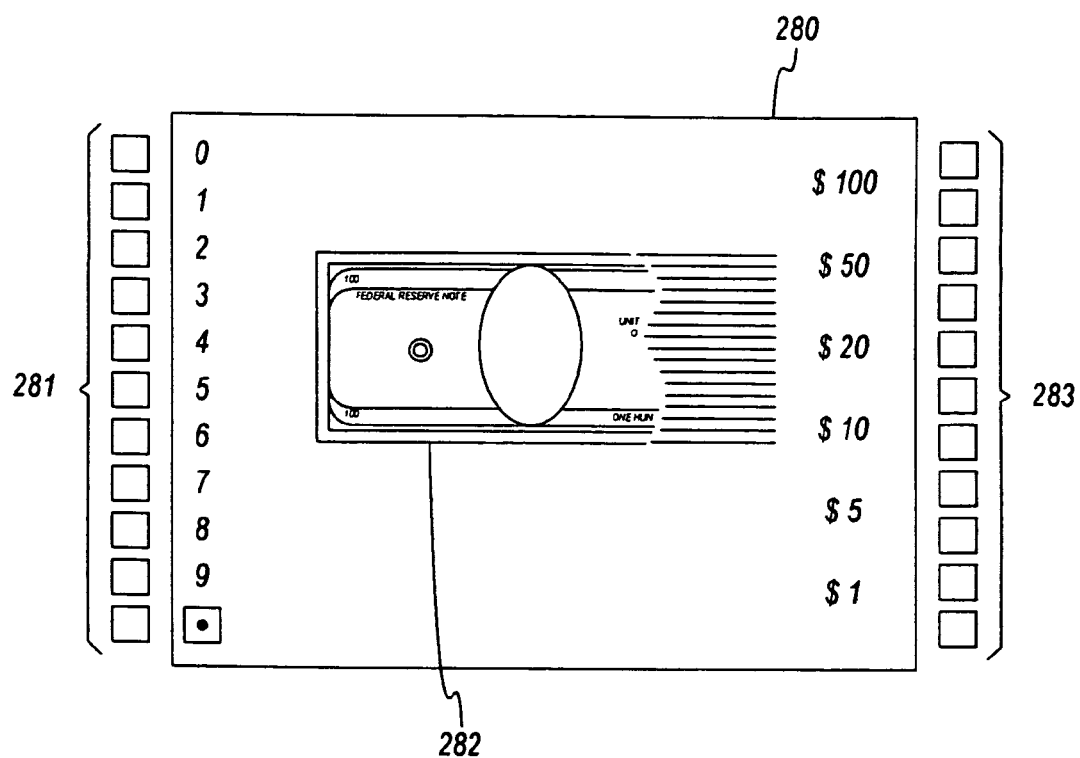
FIG. 13 is a diagrammatic illustration of a keypad for entering the value of a no-call document.
Figure 14:
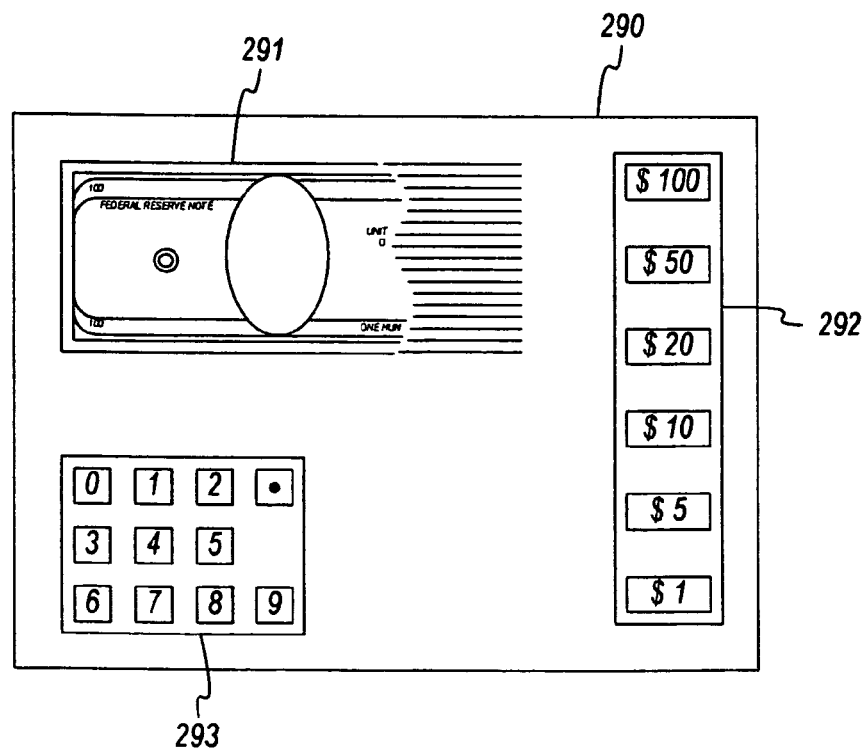
FIG. 14 is a diagrammatic illustration of a touch screen for entering the value of a no-call document on a touch screen.

An alternate embodiment of a control panel 280 is shown in FIG. 13. A set of keys 281 is used to enter numeric data which is shown on the screen, to supply data which appears to be missing from the bill image 282 on the screen. Alternatively, the user may enter denomination information using keys 283 which relate to denominations which appear on the screen. In yet another control panel embodiment, illustrated in FIG. 14, a touch screen 290 is used to enter no-call information concerning the bill image 291 on the screen. The user can enter the missing information using a keypad 293 or denomination keys 292 which appear on the touch screen. Additionally, the user could use a standard alphanumeric keyboard to complete the document image as required. Alternatively, if a personal computer terminal is used, a mouse could be used to identify and select appropriate fields. For example, if the document were a check, the unidentified field may be the signature field or the amount field. The user would "click" this field, and a second screen would appear on the terminal where the missing data would be entered. These routines could be customer-specific based upon the customer's needs. Although FIGS. 13 and 14 illustrate a bill, in other embodiments the processing system could be used with both currency and non-currency documents, such as checks.

The decentralized processing of financial instruments directly at the portals where they first enter a bank's system, may offer the following advantages: First, the information from the incomming currency bills, checks, or other documents may be entered into the banks accounting system at the earliest possible moment. Second, the handling of the physical documents may be limited to the absolute minimum legal requirements because the document images and/or information derived from those images may be transferred to the requisite locations. Finally, the risk of lost documents and errors caused by mis-handling of physical documents is minimized because the requisite images and information from the incoming documents are captured as soon as those documents reach one of the bank's entry portals.

The previous description is of preferred embodiments for implementing the invention, and the scope of the invention should not necessarily be limited by this description. The scope of the present invention is instead defined by the following claims.

What is claimed is:

1. A method of accepting deposits of currency bills into a document processing device for crediting to a specified account, comprising:
    receiving a plurality of documents associated with a deposit being made at a financial institution into an input receptacle of the document processing device, wherein the plurality of documents include a plurality of currency bills, each of the currency bills having an associated serial number;
    scanning the plurality of currency bills to produce an electronic image for each of the plurality of currency bills;
    extracting the associated serial number for each of the plurality of currency bills from the plurality of electronic images;
    denominating each of the plurality of currency bills;
    accumulating the total value of the plurality of currency bills included in the deposit; and
    in the document processing device, automatically generating a government-required report whenever the accumulated total value exceeds a prescribed value, wherein the document processing device is configured to include in the automatically generated government-required report one or more of the electronic images, an identification of the specified account at the financial institution to which the deposit is being made, the accumulated total value of the deposit, and the serial numbers associated with the currency bills included in the deposit.

2. The method according to claim 1, further comprising:
    counting a number of currency bills of each denomination included in the deposit; and
    wherein the automatically generating is configured to include the number of currency bills of each denomination included in the deposit.

3. The method according to claim 2, wherein the automatically generating is further configured include an identification of a location of the document processing device, and an identification of a teller or customer responsible for the deposit.

4. The method according to claim 3, wherein the scanning further comprises scanning a complete image of at least one side of each of the plurality of currency bills so as to produce electronic images, and wherein automatically generating the government-required report includes automatically generating the government-required report such that the electronic images are complete images of the currency bills included in the deposit.

5. The method according to claim 1, wherein the plurality of documents include at least one deposit slip, and wherein the scanning further includes scanning the at least one deposit slip to produce electronic data.

6. The method according to claim 1, further comprising:
reading the identification of the specified account at the financial institution from a card supplied by a depositor; and
storing the specified account identification with the electronic images.

7. The method according to claim 1, wherein the prescribed value is $10,000.

8. The method according to claim 1, further comprising storing the electronic images of the plurality of currency bills such that the electronic images may be retrieved and displayed for review at a time subsequent to completion of the deposit.

9. The method according to claim 1, further comprising:
detecting a suspect counterfeit currency bill included in the deposit;
generating a signal indicating the detection of the suspect counterfeit bill; and
retaining electronic data representing the detected suspect counterfeit bill in association with the identification of the specified account at the financial institution.

10. The method according to claim 1, further comprising denominating the plurality of currency bills at a rate in excess of 800 currency bills per minute.

11. The method according to claim 1, further comprising denominating the plurality of currency bills at a rate in excess of 1,000 currency bills per minute.

12. A system for accepting deposits of currency bills into a document processing device for crediting to a specified account, comprising:
an input receptacle adapted to receive a plurality of documents associated with a deposit transaction at a financial institution, and wherein the plurality of documents includes a plurality of currency bills, each of the currency bills having an associated serial number;
at least one output receptacle for receiving the plurality of documents;
an image scanner adapted to scan the currency bills to produce an electronic image for each of the currency bills;
a transport mechanism adapted to transport the plurality of documents, one at a time, from the input receptacle past the image scanner to the at least one output receptacle;
a processor adapted to extract the associated serial numbers from the electronic images; and
a denominating device for denominating each of the plurality of currency bills,
wherein the document processing device is configured to accumulate a total value of the plurality of currency bills included in the deposit transaction and to automatically generate a government-required report whenever the accumulated total value exceeds a prescribed value, the document processing device being further configured to include one or more of the electronic images, an identification of the specified account at the financial institution to which the deposit is being made, the accumulated total value, and the serial numbers extracted from the electronic images in the automatically generated government-required report.

13. The system according to claim 12, wherein the document processing device is configured to count a number of bills of each denomination included in the deposit transaction, and wherein the document processing device is configured to include the number of bills of each denomination included in the deposit transaction in the automatically generated government-required report.

14. The system according to claim 13, wherein the document processing device is configured to include an identification of a location of the document processing device and an identification of a teller or customer responsible for the deposit in the automatically generated government-required report.

15. The system according to claim 14, wherein the image scanner is adapted to scan a complete image of at least one side of each of the plurality of currency bills to produce the electronic images, and wherein the electronic images are the complete images of the currency bills included in the deposit.

16. The system according to claim 15, wherein the plurality of documents includes at least one deposit slip, and wherein the image scanner is adapted to scan the at least one deposit slip to produce an electronic image of the at least one deposit slip, and wherein the document processing device is configured to include the electronic image of the at least one deposit slip in the automatically generated government-required report.

17. The system according to claim 16, further comprising:
a card reader that reads the identification of the specified account at the financial institution from a card supplied by a depositor; and
a memory storing the account identification with the electronic images relating to the deposit transaction.

18. The system according to claim 17, wherein the memory storing the electronic images of the plurality of currency bills stores the electronic images such that the electronic images can be retrieved and displayed for review at a time subsequent to completion of the deposit transaction.

19. The system according to claim 18, further comprising a suspect counterfeit detector that detects suspect counterfeit currency bills included in the deposit and generates a signal that indicates the detection of a suspect counterfeit bill.

20. The system according to claim 19, wherein the transport mechanism is adapted to transport documents and the denominating device is adapted to denominate documents at a rate in excess of 800 documents per minute.

21. The system according to claim 19, wherein the transport mechanism is adapted to transport documents and the denominating device is adapted to denominate documents at a rate in excess of 1000 documents per minute.

22. The system according to claim 19, wherein the prescribed value is $10,000.

23. A document processor for processing a deposit of currency bills into a specified account at a financial institution, the document processor comprising:
an input receptacle adapted to receive documents associated with a deposit transaction being made at the financial institution, the documents including currency bills, each of the currency bills being associated with a respective serial number;
an image scanner adapted to scan the documents to produce an electronic image for each of the documents;
a transport mechanism adapted to transport the documents, one at a time, from the input receptacle past the image scanner to at least one output receptacle;

a denominating device adapted to denominate the currency bills; and a processor programmed to accumulate the total value of the currency bills included in the deposit transaction, to extract the associated serial numbers from the electronic images of the currency bills, and to automatically generate a government-required report whenever the accumulated total value exceeds a prescribed value, the processor further being programmed to include the associated serial numbers of the currency bills, an identification of the specified account at the financial institution to which the deposit is being made, and the accumulated total value of the currency bills in the automatically generated government-required report.

24. The document processor according to claim 23, wherein the transport mechanism is adapted to transport documents and the denominating device is adapted to denominate currency bills at a rate of approximately 800 to 1000 documents per minute.

25. The document processor according to claim 24, wherein the transport mechanism is adapted to transport documents and the denominating device is adapted to denominate currency bills at a rate in excess of 1000 documents per minute.

26. The document processor according to claim 23, further comprising:
a memory adapted to store the electronic images such that the electronic images may be retrieved and displayed for review after completion of the deposit transaction,
wherein the processor is programmed to count a number of currency bills of each denomination included in the deposit transaction, and wherein the processor is programmed to include the number of currency bills of each denomination included in the deposit in the automatically generated government-required report.

27. The document processor according to claim 26, wherein the processor is programmed to include an identification of a location of the document processing device, and an identification of a teller or customer responsible for the deposit in the automatically generated government-required report.

28. The document processor according to claim 27, wherein the image scanner is adapted to scan at least one side of the currency bills to produce the electronic images, and wherein the electronic images are complete images of the currency bills.

29. The document processor according to claim 28, wherein the documents include at least one deposit slip, the scanner being adapted to scan the deposit slip to produce an electronic image of the deposit slip, and wherein the processor is programmed to include the electronic image of the deposit slip in the automatically generated government-required report.

30. The document processor according to claim 29, wherein the prescribed value is $10,000.

31. The document processor according to claim 30, wherein the processor is programmed to include one or more of the electronic images of the currency bills in the automatically generated government-required report.

32. A method for processing a deposit of currency bills into a document processing device, the deposit associated with a specified account at a financial institution, the method comprising:
receiving a plurality of currency bills associated with a deposit transaction being made at the financial institution;

scanning at least a portion of each of the currency bills with an image scanner to produce electronic data representing at least a partial image of each of the currency bills;
transporting the plurality of currency bills, one at a time, from an input receptacle past the image scanner to at least one output receptacle;
denominating the plurality of currency bills;
extracting a serial number from each of the at least partial images of the plurality of currency bills;
storing the electronic data so that the at least partial images may be retrieved and displayed for review after completion of the deposit;
accumulating a total value of the plurality of currency bills included in the deposit transaction; and
automatically generating and printing a government-required report whenever the accumulated total value exceeds a prescribed value, the automatically generating the government-required report comprising including in the report the extracted serial numbers from the at least partial images of the plurality of currency bills, an identification of the specified account at the financial institution to which the deposit is being made, and the accumulated total value of the plurality of currency bills included in the deposit transaction.

33. The method according to claim 32, wherein denominating further comprises denominating the plurality of currency bills at a rate of approximately 800 to 1000 currency bills-per minute.

34. The method according to claim 32, wherein denominating further comprises denominating the plurality of currency bills at a rate in excess of 1000 currency bills per minute.

35. The method according to claim 32, wherein automatically generating and printing the government-required report further comprises automatically generating and printing the government-required report whenever the accumulated total value exceeds $10,000.

36. The method according to claim 32, further comprising:
counting a number of currency bills of each denomination included in the deposit transaction; and
including the number of currency bills of each denomination included in the deposit transaction in the automatically generated report.

37. The method according to claim 36, further comprising:
identifying a location of the document processing device; and
identifying a teller or customer responsible for the deposit.

38. The method according to claim 37, wherein the scanning further comprises scanning a complete image of at least one side of each currency bill to produce the electronic data.

39. The method according to claim 38, wherein automatically generating and printing the government-required report further comprises including in the automatically generated government-required report the complete image of each currency bill included in the deposit transaction.

40. The method according to claim 39, further comprising:
receiving a deposit slip;
scanning the deposit slip to produce electronic data representing at least a partial video image of the deposit slip; and
including in the automatically generated government-required report the at least partial image of the deposit slip.

41. The method according to claim 40, further comprising including the at least partial images of the currency bills in the automatically generated government-required report.

42. The method according to claim 41, wherein the prescribed value is $10,000.

43. The method according to claim 8, wherein the electronic images represent at least a partial video image of each currency bill.

44. The system according to claim 12, wherein the electronic images represent at least a partial image of each currency bill.

45. The processor according to claim 23, wherein the electronic images represent at least a partial image of each currency bill.

* * * * *